United States Patent
Atsumi et al.

(10) Patent No.: US 7,756,045 B2
(45) Date of Patent: Jul. 13, 2010

(54) OPTICAL CROSS CONNECT APPARATUS AND NETWORK

(75) Inventors: Toshiyuki Atsumi, Yokohama (JP); Masatoshi Shibasaki, Yokohama (JP); Teruhisa Takano, Ebina (JP)

(73) Assignee: Hitachi, Ltd., Tokyo (JP)

( * ) Notice: Subject to any disclaimer, the term of this patent is extended or adjusted under 35 U.S.C. 154(b) by 110 days.

(21) Appl. No.: 12/212,888

(22) Filed: Sep. 18, 2008

(65) Prior Publication Data
US 2009/0022059 A1 Jan. 22, 2009

Related U.S. Application Data

(62) Division of application No. 11/043,389, filed on Jan. 24, 2005, now Pat. No. 7,433,371.

(30) Foreign Application Priority Data
Jan. 26, 2004 (JP) .............................. 2004-016463

(51) Int. Cl.
*H04L 1/00* (2006.01)
(52) U.S. Cl. ................... 370/244; 370/498; 370/252; 709/220; 709/223; 398/25; 398/30; 398/33
(58) Field of Classification Search .............. 370/244, 370/498, 252; 398/25, 30, 33; 709/220, 709/223
See application file for complete search history.

(56) References Cited

U.S. PATENT DOCUMENTS

| 6,256,127 | B1 | 7/2001 | Taylor |
| 6,822,975 | B1 | 11/2004 | Stroll et al. |
| 6,873,797 | B2 * | 3/2005 | Chang et al. ............. 398/51 |
| 7,164,692 | B2 | 1/2007 | Cox et al. |
| 7,263,285 | B2 | 8/2007 | Adleman et al. |
| 7,266,296 | B2 | 9/2007 | Ovadia et al. |
| 2002/0010787 | A1 | 1/2002 | Masuda |
| 2003/0231886 | A1 | 12/2003 | Young et al. |
| 2004/0028408 | A1* | 2/2004 | Cox et al. .............. 398/66 |
| 2005/0002669 | A1 | 1/2005 | Adleman et al. |
| 2005/0286521 | A1 | 12/2005 | Chiang et al. |

(Continued)

FOREIGN PATENT DOCUMENTS

JP 09-074411 A 3/1997

(Continued)

*Primary Examiner*—Ricky Ngo
*Assistant Examiner*—Luat Phung
(74) *Attorney, Agent, or Firm*—Townsend and Townsend and Crew LLP

(57) ABSTRACT

An optical signal connection apparatus comprising a first node and a second node connects first and second optical signal transmission lines to respective first and second routers. The first node includes a first port coupled to the first router via the first optical signal transmission line, and is configured to handle a first type of optical signals associated with the first router. The second node includes a second port coupled to the second router via the second optical signal transmission line, and is configured to handle a second type of optical signals associated with the second router. The information regarding the first type of optical signal is compared with information regarding the second type of optical signal to determine whether or not the first and second optical signal transmission lines are compatible to each other.

5 Claims, 17 Drawing Sheets

U.S. PATENT DOCUMENTS

| | | |
|---|---|---|
| 2006/0002419 A1 | 1/2006 | Cox et al. |
| 2006/0291859 A1 | 12/2006 | Young et al. |

FOREIGN PATENT DOCUMENTS

| | | |
|---|---|---|
| JP | 2002-27012 A | 1/2002 |
| JP | 2002-344446 A | 11/2002 |
| JP | 2003-219030 A | 7/2003 |

* cited by examiner

FIG.5

Signal-type table for node A46 — 510

| Node | Port | Signal-type information | | | Remark |
|---|---|---|---|---|---|
| | | Frame configuration | Mapping method | L2 protocol type | |
| A | a | OC-192 | 64B/66B | Ethernet(*1) | WAN PHY |
| | b | OC-192 | 64B/66B | Ethernet(*1) | WAN PHY |
| | d | OC-192 | PPP over SONET/SDH | Ethernet(*1) | 10G POS |

501 / 502

Signal-type table for node B45 — 520

| Node | Port | Signal-type information | | | Remark |
|---|---|---|---|---|---|
| | | Frame configuration | Mapping method | L2 protocol type | |
| B | b | OC-192 | PPP over SONET/SDH | Ethernet(*1) | 10G POS |

Signal-type table for node C41 — 530

| Node | Port | Signal-type information | | | Remark |
|---|---|---|---|---|---|
| | | Frame configuration | Mapping method | L2 protocol type | |
| C | c | OC-192 | 64B/66B | Ethernet(*1) | WAN PHY |
| | e | OC-192 | PPP over SONET/SDH | Ethernet(*1) | 10G POS |

503 / 504

Signal-type table for node D48 — 540

| Node | Port | Signal-type information | | | Remark |
|---|---|---|---|---|---|
| | | Frame configuration | Mapping method | L2 protocol type | |
| D | a | OC-192 | 64B/66B | Ethernet(*1) | WAN PHY |
| | b | OC-192 | PPP over SONET/SDH | Ethernet(*1) | 10G POS |
| | e | OC-192 | 64B/66B | Ethernet(*1) | WAN PHY |
| | f | OC-192 | PPP over SONET/SDH | Ethernet(*1) | 10G POS |

FIG.10

Signal-type table for node A96 1001

| Node | Port | Signal-type information | | | | Remark |
| --- | --- | --- | --- | --- | --- | --- |
| | | Signal velocity | Frame configuration | Mapping method | L2 protocol type | |
| A | a | 9.95328 Gbit/s | OC-192 | 64B/66B | Ethernet(*1) | WAN PHY |
| | e | 10.3125 Gbit/s | — | 64B/66B | Ethernet(*1) | |
| | f | 9.95328 Gbit/s | OC-192 | PPP over SONET/SDH | Ethernet(*1) | 10G POS |
| | g | 1.25 Gbit/s | — | 8B/10B | Ethernet(*1) | |

Signal-type table for node B95 1002

| Node | Port | Signal-type information | | | | Remark |
| --- | --- | --- | --- | --- | --- | --- |
| | | Signal velocity | Frame configuration | Mapping method | L2 protocol type | |
| B | b | 9.95328 Gbit/s | OC-192 | 64B/66B | Ethernet(*1) | WAN PHY |
| | d | 9.95328 Gbit/s | OC-192 | GFP | Fibre Channel | |
| | e | 2.48832 Gbit/s | OC-48 | GFP | PPP | |

Signal-type table for node C91 1003

| Node | Port | Signal-type information | | | | Remark |
| --- | --- | --- | --- | --- | --- | --- |
| | | Signal velocity | Frame configuration | Mapping method | L2 protocol type | |
| C | c | 9.95328 Gbit/s | OC-192 | 64B/66B | Ethernet(*1) | WAN PHY |
| | e | 9.95328 Gbit/s | OC-192 | PPP over SONET/SDH | Ethernet(*1) | 10G POS |
| | g | 2.48832 Gbit/s | OC-48 | PPP over SONET/SDH | Ethernet(*1) | |
| | i | 2.48832 Gbit/s | OC-48 | GFP | PPP | |
| | j | 1.25 Gbit/s | — | 8B/10B | Ethernet(*1) | |

Signal-type table for node D98 1004

| Node | Port | Signal-type information | | | | Remark |
| --- | --- | --- | --- | --- | --- | --- |
| | | Signal velocity | Frame configuration | Mapping method | L2 protocol type | |
| D | a | 9.95328 Gbit/s | OC-192 | 64B/66B | Ethernet(*1) | WAN PHY |
| | b | 10.3125 Gbit/s | — | 64B/66B | Ethernet(*1) | |
| | e | 2.48832 Gbit/s | OC-48 | PPP over SONET/SDH | Ethernet(*1) | |
| | f | 9.95328 Gbit/s | OC-192 | GFP | Fibre Channel | |

(*1) The Ethernet is a registered trademark

FIG. 11

Display screen

Select a node and its port to serve as the end point of a path and enter them to the following entries:

1101 — Node: [ ]   Port: [ ] — 1102

Table of connectable input/output ports    1103

| Path start point | Path end point | Signal velocity | Frame configuration | Mapping method | L2 protocol type |
|---|---|---|---|---|---|
| Node A Port a | Node B Port b | 9.95328 Gbit/s | OC-192 | 64B/66B | Ethernet |
|  | Node C Port c | 9.95328 Gbit/s | OC-192 | 64B/66B | Ethernet |
|  | Node D Port a | 9.95328 Gbit/s | OC-192 | 64B/66B | Ethernet |

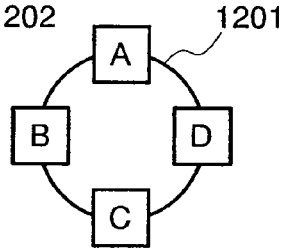

FIG. 13

Display screen

Connectability determination result: OK — 1301

Information on the type of a signal passing through port 1 of node A serving as the start point — 1302

| Frame configuration | Mapping method | L2 protocol type |
|---|---|---|
| OC-192 | 64B/66B | Ethernet |

Information on the type of a signal passing through port 3 of node C serving as the end point — 1303

| Frame configuration | Mapping method | L2 protocol type |
|---|---|---|
| OC-192 | 64B/66B | Ethernet |

FIG. 14

Display screen

Connectability determination result: NG
Reason: Different mapping methods — 1401

Information on the type of a signal passing through port 1 of node A serving as the start point — 1402

| Frame configuration | Mapping method | L2 protocol type |
|---|---|---|
| OC-192 | 64B/66B | Ethernet |

Information on the type of a signal passing through port 5 of node C serving as the end point — 1403

| Frame configuration | Mapping method | L2 protocol type |
|---|---|---|
| OC-192 | PPP over SONET/SDH | Ethernet |

FIG.18

Display screen

Warning: Mismatching signal types
Mismatching port: Port c of node C — 1801

Cataloged information on the type of a signal passing through port 5 of node C — 1802

| Frame configuration | Mapping method | L2 protocol type |
|---|---|---|
| OC-192 | 64B/66B | Ethernet |

Detected information on the type of a signal passing through port 5 of node C — 1803

| Frame configuration | Mapping method | L2 protocol type |
|---|---|---|
| OC-192 | PPP over SONET/SDH | Ethernet |

FIG.19

Display screen

Select a node and its port to serve as the start point of a path and enter them to the following entries:

1901 — Node:     Port: — 1902

1903 —

| Start-point node | Port | | | | |
|---|---|---|---|---|---|
| Node A | 1 | 2 | 3 | 4 | 5 |
| Node B | 1 | 2 | 3 | | |
| Node C | 1 | 2 | 3 | 4 | |
| Node D | 1 | 2 | 3 | 4 | 5 |

— 1904

OK

OPTICAL CROSS CONNECT APPARATUS AND NETWORK

CROSS-REFERENCES TO RELATED APPLICATIONS

This is a divisional of U.S. patent application Ser. No. 11/043,389, filed on Jan. 24, 2005, which application claims priority to Japanese Patent Application No. 2004-016463, filed on Jan. 26, 2004, the entire disclosure of which is incorporated herein by reference.

BACKGROUND OF THE INVENTION

The present invention relates to an optical cross connect apparatus used in an optical transmission system as an apparatus for switching large-capacity lines on an optical layer and adding/dropping such lines. The invention further relates to a network management apparatus for monitoring and controlling the optical cross connect apparatus.

In recent years, broadband lines have been becoming popular also at homes and the demand for the broadband lines for mainly handling IP traffic has been rapidly increasing. Transmission apparatus for handling such a variety of high-speed lines include an OXC (optical cross connect) apparatus and an OADM (Optical Add-Drop Multiplexer). The OXC apparatus has an optical cross connect function for switching routes between a plurality of input/output ports passed through by optical signals by keeping the optical signals unprocessed as they are. On the other hand, the OADM is capable of adding and dropping a variety of lines passed through by optical signals by using a waveform division multiplexing technology with the optical signals unprocessed as they are. Thus, the OXC apparatus and the OADM are transmission apparatus capable of transmitting a received high-velocity and broadband optical signal to a destination by way of a transmission network at a high velocity by handling the received optical signal as it is, carrying out no signal processing on the signal at all and merely switching the route of the optical signal with the signal unprocessed as it is. The signal processing includes a process to terminate and modify data and header of the received optical signal.

The transmission apparatus provided at each node between bases turns on and off a switch employed therein to connect any arbitrary input port of the apparatus to any arbitrary output port thereof. Thus, a network connected to the input port of the transmission apparatus is linked to a network connected to the output port thereof. As a result, an optical path of a service signal can be provided through an arbitrary route between the input and output ports.

These transmission apparatus are characterized in that the apparatus are capable of handling a variety of service optical signals exchanged between users and changing routes of the optical signals by keeping the optical signals unprocessed as they are without regard to the data type of the signal. The data type of the handled optical signal is expressed in terms of the velocity of the signal, the frame format of the signal, the type of the transmission protocol of the signal and the encoding method of the signal.

The conventional line exchange apparatus has means for detecting an incorrect connection existing between terminals connected to the apparatus at a line exchange time. As a method of detecting an incorrect connection, there are techniques disclosed in Japanese Patent Laid-open No. 2003-219030 and Japanese Patent Laid-open No. Hei 9-074411. In accordance with the method disclosed Japanese Patent Laid-open No. 2003-219030, a specific pattern or identifier is inserted into a received user signal for a collation purpose. In accordance with the method disclosed in Japanese Patent Laid-open No. Hei 9-074411, on the other hand, information such as call control information is exchanged between line exchange apparatus at consecutive times to establish connection between the apparatus.

With these conventional misconnection detection methods, an incorrect connection between lines can be detected only after the line exchange apparatus have already been connected to each other physically and only if interfaces such as the electrical level of an electrical signal flowing through a line connecting the line exchange apparatus match each other. Thus, with the conventional misconnection detection methods, an incorrect connection cannot be determined till the lines are actually connected to each other. That is to say, the conventional misconnection detection methods do not provide means for avoiding such a state of an incorrect connection in advance before setting lines.

As described in patent documents 1 and 2, the conventional line exchange apparatus monitors the state of connection with an adjacent line exchange apparatus and the state of connection inside the line exchange apparatus, that is, the state of connections between input and output ports of the line exchange apparatus. That is to say, these conventional line exchange apparatus do not monitor the state of all connections of lines serving as routes for user signals between input points and output points in a concentrated manner. An input point is a point in a line exchange network comprising a plurality of line exchange apparatus connected to each other. A user signal transmitted by a user terminal enters the line exchange network by way of the input point. An output point is a point from which the user signal leaves the line exchange network, propagating to the terminal of a user serving as a communication partner by way of the line exchange apparatus.

BRIEF SUMMARY OF THE INVENTION

First of all, as a cause of an incorrect connection, a difference in data format between user signals is explained. In the following explanation, a 10GBASE-W signal and a PPP-over-SONET/SDH signal are each taken as an example. Handled in the OXC apparatus and/or the OADM, the 10GBASE-W signal and the PPP-over-SONET/SDH signal are user signals referred to hereafter as a WAN PHY signal and a 10G POS signal respectively. The WAN PHY signal is prescribed in IEEE802.3ae specifications and the 10G POS signal is prescribed in IETF RFC 2615 specifications.

To begin with, the frame format of the WAN PHY signal is shown in FIG. 1. The WAN PHY signal is generated in the following order. First of all, a 64B/66B encoding process prescribed in the IEEE802.3ae specifications is carried out on an Ethernet signal.

The 64B/66B encoding process divides the Ethernet signal into unit blocks each having a size of 64 bits. The data of each block is then subjected to a conversion process according to a conversion table prescribed in the IEEE802.3ae specifications. Then, a header having a length of 2 bits is added to the result of the conversion process to serve as a delimiter between blocks to provide a unit block having a size of 66 bits.

Subsequently, the unit blocks obtained as a result of the 64B/66B encoding process are sequentially mapped onto an OC-192 payload 11, to which a variety of headers is further added to generate a WAN PHY signal. The headers include an OC-192 POH path overhead) 12, an OC-192 SOH (section overhead) 13, an C-192 LOH (line overhead) 14 and a pointer 15.

The frame configuration and the configuration of the overheads are the same as the frame format of an OC-192 signal prescribed in Telcordia GR-253 specifications or the like.

Next, the frame format of the 10G POS signal is shown in FIG. 2. The 10G POS signal is generated as follows. First of all, a fixed value is inserted between MAC frames of an Ethernet (trademark) signal to convert data of the Ethernet signal. The rule of the conversion is prescribed in the IETF RFC 2615 specifications and is referred to as HDLC (High-level Data Link Control)-like framing. Pieces of data generated by the HDLC-like framing are sequentially mapped onto an OC-192 payload 21, to which a variety of headers is further added to generate a 10G POS signal. The headers include an OC-192 POH path overhead) 22, an OC-192 SOH (section overhead) 23, an OC-192 LOH (line overhead) 24 and a pointer 25.

The frame configuration and the configuration of the overheads are the same as the frame format of an OC-192 signal prescribed in the Telcordia GR-253 specifications as is the case with the WAN PHY signal.

FIG. 3 is a diagram showing the system configuration of the conventional technology. The system shown in FIG. 3 is an optical cross connect system comprising optical cross connect apparatuses 33, 34, 35 and 36 connected to each other to form a ring-like configuration and a network management apparatus 37 for remotely monitoring and controlling the optical cross connect apparatuses 33, 34, 35 and 36. In the following description, the optical cross connect apparatuses 33, 34, 35 and 36 are also referred to as nodes A, B, C and D, respectively. The network management apparatus 37 is connected to each of the nodes through a general public network 38. In the system shown in the figure, a router A31 for carrying out communications by using the WAN PHY signal 301 is handled by the node A33 and a router B32 for carrying out communications by using the 10G POS signal 303 is handled by the node C35.

If the person in charge of system maintenance uses the network management apparatus 37 to complete an operation of setting a line connecting an input/output port of the node A33 handling the router A31 using the WAN PHY signal 301 to an input/output port of the node C35 handling the router B32 using the 10G POS signal 303, the line-setting operation itself should be normally completed so that the routers A31 and B32 are connected to each other by a route to establish a physical connection between the WAN PHY signal 301 and the 10G POS signal 303 on an optical layer. In the system configuration of the figure, the line connecting the input/output ports is shown as a dotted bold route 302.

As described earlier, however, the WAN PHY signal 301 and the 10G POS signal 303 have different encoding and decoding methods in a process of mapping the Ethernet signals onto the OC-192 payloads in spite of the fact that the WAN PHY signal 301 and the 10G POS signal 303 have the same OC-192 frame format. Thus, even if a line connecting the routers A and B is set to establish a route for flowing a user signal between the routers A and B, the router B32 is not capable of correctly decoding the WAN PHY signal encoded and transmitted by the router A31 into an Ethernet (trademark) signal.

As described above, even if a connection on the optical layer is established, the conventional technology does not provide means for determining whether or not the connection is incorrect. Thus, it is impossible to determine whether or not the connection is incorrect until a user signal is transmitted through the established route. Even in the typical system configuration described above, a data error is generated, causing a situation in which the router A31 is not capable of communicating with the router B32 in spite of the fact that a connection on the optical layer has been established.

In order to let an optical cross connect apparatus carrying out line exchanges on an optical layer, as is the case with an OXC apparatus and an OADM transmit data at a high speed by substantially reducing transmission delays, the optical cross connect apparatus shown in FIG. 3 is characterized in that the apparatus transparently handles a received user signal such as the WAN PHY signal 301 or the 10G POS signal 303 without carrying out any processing on the signal so as to keep the signal remaining as it is. Thus, applying means for carrying out processes according to the conventional method to detect an incorrect connection on the received user signal to the network comprising the optical cross connect apparatus described above makes it difficult for the optical cross connect apparatus to implement the high-speed transfer processing and implement the data-transfer transparency, which is a characteristic of the optical cross connect apparatus. The processes according to the conventional method to detect an incorrect connection includes a process to terminate the user signal, a process to analyze the contents of the user signal, a process to exchange node information with each other and a process to modify the data of the user signal by inserting an identifier into the processed data or the like. In this way, if the optical cross connect apparatus inadvertently connects user signals of different types, the optical cross connect apparatus is not capable of reporting the state of an incorrect connection to the network management apparatus 37.

With such a conventional technology, even if the line setting obtained as a result of a line exchange carried out by the optical cross connect apparatus is a misconnection state preventing users to communicate with each other, the optical cross connect apparatus is not capable of detecting the misconnection state, which causes a failure and hence incapable of reporting such a state of an incorrect connection due to the fact that the optical cross connect apparatus is not capable of processing a signal exchanged by users. Thus, the person in charge of system maintenance does not have means for detecting a state of an incorrect connection in line setting between optical cross connect apparatus from the network management apparatus. In addition, since the range of the network covers a wide area, the person in charge of system maintenance takes a long time to recognize a failure and it is difficult to detach the failing portion from the system.

In addition, the network operated in the state of an incorrect connection raises a problem that it is necessary to delete the line setting causing the state of an incorrect connection and make new setting in order to recover from the state of a failure and much labor is required to do the recovery work. On top of that, besides this maintenance difficulty, a cutoff-line state caused by an incorrect connection has a big effect on the service rendered by the system, giving rise to a disadvantage for the user. This is because the optical cross connect apparatus is an apparatus for carrying out a line exchange process at a high processing speed on large-capacity transmission lines involving many user lines each conveying an optical signal.

Thus, it is necessary to provide an apparatus, which is used for connecting and switching large-capacity transmission lines as is the case with the optical cross connect apparatus, with means for determining possible existence of a misconnection prior to connection of transmission lines and avoiding such an incorrect connection in advance instead of the means for detecting an incorrect connection after connection of transmission lines as is the case with the conventional technology.

One feature of the present embodiment provides a method of monitoring a state of inter-user connection through a plurality of nodes such as optical cross connect apparatus for switching and connecting large-capacity transmission lines on physical layers (layers 1) by using a network management apparatus 37 in a concentrated manner in a process of setting transmission lines in the optical cross connect apparatus represented by the aforementioned OXC apparatus and the aforementioned OADM. It is another object of the present invention to provide a method of determining whether or not a connection on not only the physical layers but also layers higher than the physical layers is possible. It is a further object of the present invention to provide a method of reporting the state of an incorrect connection to the person in charge of system maintenance as a state of incorrect line exchange setting made by the person. That is to say, it is an object of the present invention to provide means for avoiding incorrect line setting (or an incorrect connection) that would otherwise link mutually incompatible user signals on the physical layer in advance and means for reporting a result of determination to the person in charge of system maintenance. The mutually incompatible user signals are user signals having attributes, which include data formats and/or protocols, different from each other on the physical layer and layers higher than the physical layer.

In order to solve the problems described above, the present embodiment provides an optical cross connect apparatus for switching optical transmission lines under control executed by a network management apparatus remotely located from the optical cross connect apparatus with an IF unit, a signal-type storage unit, a switch, a signal type transmission unit and a control unit. The IF unit handles terminals. The signal-type storage unit stores the type of a signal used by each of the terminals handled by the IF unit. The switch sets line switching between the optical transmission lines as well as between the optical transmission lines and the terminals. The signal-type transmission unit transmits a signal type stored in the signal-type storage unit in response to a request received from the network management apparatus as a request for the signal type, which is the type of a signal used by one of the terminals. The control unit controls the switch in accordance with a line-setting command received from the network management apparatus when receiving such a command.

The present embodiment further provides the network management apparatus for monitoring and controlling the optical cross connect apparatus through a general public network with a line-setting unit, signal-type-requesting means, a determination unit and a monitor/control unit. The line-setting unit receives a line-setting command for the optical cross connect apparatus. The signal-type-requesting means issues a request for the type of a signal, which is used by one of the terminals connected to the optical cross connect apparatus, to the optical cross connect apparatus in response to a line-setting command supplied to the optical cross connect apparatus. The determination unit receives a response to the request for the type of a signal from the optical cross connect apparatus and comparing the signal type indicated by the response with a signal type indicated by another response. The monitor/control unit gives a line-setting command to the optical cross connect apparatus in accordance with a determination result output by the determination unit.

The present embodiment provides an optical cross connect system capable of detecting an incorrect connection in advance even before a physical connection between apparatus each carrying out a line exchange process is established unlike the conventional method for detecting an incorrect connection. In addition, the system is capable of managing states regarding whether or not a system connection is possible in a concentrated manner.

The optical cross connect apparatus for handling a variety of high-velocity and broadband optical communication lines used in the optical cross connect system is provided with a function for cataloging the type of each signal used in networks connected to input/output ports employed in the optical cross connect apparatus and a function for recognizing connectability or determining whether or not a connection is possible prior to actual connection of these networks. Accordingly, it is possible to avoid an incorrect connection between signals having different services and/or different protocols beforehand as well as avoid a state of mismatching communication speeds in advance. Incorrectly connected large-capacity transmission lines would have a bad effect on a service provided by the transmission lines. With such an optical cross connect apparatus, however, such an effect can be reduced to a minimum. In addition, the networks can be prevented from being operated in the state of an incorrect connection. Thus, unlike the conventional optical cross connect system, a maintenance work caused by an incorrect connection of networks is no longer required. As a result, the frequency of the system maintenance can be decreased. In particular, the method provided by the present invention is effective for an apparatus and a system, which are used for handling a variety of diverse large-capacity transmission lines having different kinds, without regard to the velocity and protocol type of a signal propagating through each of the transmission lines.

In one embodiment, a optical signal connection apparatus for connecting first and second optical signal transmission lines to first and second routers, respectively, is disclosed. The first and second routers are configured to handle both optical signals and electrical signals. The optical signal connection apparatus comprises a first node and a second node. The first node includes a first port that is coupled to the first router via the first optical signal transmission line, the first port being configured to handle a first type of optical signals associated with the first router, the first optical signal transmission line defining a first communication link; a first line-setting unit configured to couple the first and second nodes to enable data communication between the first and second nodes using optical signals; a first control unit to control the first line-setting unit in setting an optical communication link between the first and second nodes; and a first signal-type storage unit configured to store first information on the first type of optical signals that the first port is configured to handle. The second node includes a second port that is coupled to the second router via the second optical signal transmission line, the second port being configured to handle a second type of optical signals associated with the second router, the second optical signal transmission line defining a second communication link, wherein the first information is compared with second information on the second type of optical signal to determine whether or not the first and second communication links are compatible to each other.

In one embodiment, a management apparatus for establishing communication links amongst a plurality of nodes in an optical network includes an input unit configured to receive a command to connect an optical transmission line to a first port of a first node to a first router and a second port of a second node to a second router, the first and second routers being configured to handle both optical signals and electrical signals, the first and second nodes being configured to exchange the optical signals with the first and second routers but not the electrical signals; and a control unit configured to transmit a first message to the first node requesting the first node to provide first information on a signal type that the first port is configured to process and a second message to the second node to provide second information on a signal type that the second port is configured to process. The first and second information obtained from the first and second ports are compared to determine communication compatibility between the first and second ports.

Another embodiment relates to a connection apparatus for connecting a plurality of optical signal transmission lines, which are each wired to one of ports employed in the connection apparatus, by setting a communication route between the ports wired to the optical signal transmission lines in accordance with a command received from a management apparatus for managing connections of the optical signal transmission lines. The connection apparatus comprises a signal-type storage unit for storing signal-type information for each of at least some of the ports by associating the information with an identification of the port where the signal-type information of any particular one of the ports is information on the type of an optical signal passing through the particular port; and a control unit for obtaining at least some of the types of optical signals from the signal-type storage unit and transmitting the types of optical signals to the management apparatus in accordance with a demand raised by the management apparatus.

Another embodiment relates to an optical signal transmission network management system for connecting a plurality of optical signal transmission lines to each other to set an optical signal transmission route comprising the connected optical signal transmission lines. The system comprises nodes, each individual one of which is placed among the optical signal transmission lines and connected to the optical signal transmission lines by ports employed in the individual node; and a management apparatus for giving a command to each individual one of the nodes to connect the optical signal transmission lines wired to the ports employed in the individual node. Each individual one of the nodes includes a line-setting unit capable of setting a communication route between any two of the ports employed in the individual node; a first control unit for giving a command to the line-setting unit to set a communication route between first and second ones of the ports employed in the individual node in accordance with a command received from the management apparatus; and a signal-type storage unit for storing information on an optical signal passing through each of at least some particular ones, which are selected among the ports employed in the individual node as particular ports including the first port. The management apparatus has a second control unit for transmitting a command to a specific one of the nodes as a command requesting the specific node to set an optical signal transmission route including one of the optical signal transmission lines, which is connected to the first port. The individual node retrieves information on the type of an optical signal passing through the first port from the signal-type storage unit and transmits the information to the management apparatus.

In yet another embodiment, an optical signal transmission network management system comprises a plurality of nodes capable of connecting a plurality of optical signal transmission lines each wired to one of ports employed in each of the nodes by setting a communication route between any of the ports wired to the optical signal transmission lines; and a network management apparatus connected to the nodes by a communication network and used for issuing a command to any individual one of the nodes by way of the communication network as a command to set a communication route between specific ones of the ports employed in the individual node in order to establish an optical signal transmission route connecting the optical signal transmission lines wired to the specific ports. The management port comprises a setting input unit for accepting any first one of the ports employed in any first one of the nodes and wired to any first one of the optical signal transmission lines and accepting any second one of the ports employed in any second one of the nodes and wired to any second one of the optical signal transmission lines as start and end points of the optical signal transmission route connecting the first optical signal transmission line to the second optical signal transmission line; and a first control unit for requesting the first node that first signal-type information representing properties of an optical signal propagating through the first optical signal transmission line and passing through the first port be transmitted as well as requesting the second node that second signal-type information representing properties of an optical signal propagating through the second optical signal transmission line and passing through the second port be transmitted. The first node includes a signal-type storage unit for storing a relation associating the first port with the first signal-type information; and a second control unit for retrieving the first signal-type information from the signal-type storage unit and transmitting the first signal-type information to the management apparatus at a request made by the management apparatus. The second node includes a signal-type storage unit for storing a relation associating the second port with the second signal-type information; and a second control unit for retrieving the second signal-type information from the signal-type storage unit and transmitting the second signal-type information to the management apparatus at a request made by the management apparatus.

BRIEF DESCRIPTION OF THE DRAWINGS

FIG. 5 is a diagram showing signal-type tables each stored in the signal-type storage unit employed in every node.

FIG. 10 is a diagram showing signal-type tables, which are each stored in the signal-type storage unit employed in every node of the fourth embodiment of the present invention.

FIG. 11 is a diagram showing a display screen of a network management apparatus employed in the fourth embodiment of the present invention.

FIG. 12 is a diagram showing a setting screen appearing on a display unit while a person in charge of system maintenance is setting transmission lines.

FIG. 13 is a diagram showing a typical screen displayed to the person in charge of system maintenance for a case in which a connection is determined by a line-settability determination unit to be possible.

FIG. 14 is a diagram showing a typical screen displayed to the person in charge of system maintenance for a case in which a connection is determined by a line-settability determination unit to be impossible.

FIG. 18 is a diagram showing a typical screen displayed by the third embodiment to indicate that cataloged signal-type information does not match recognized signal-type information.

FIG. 19 is a diagram showing a typical display screen for selecting a node to start as a start point in the fourth embodiment.

DETAILED DESCRIPTION OF THE INVENTION

The following description explains details of embodiments, by referring to diagrams, each implementing a network comprising an optical cross connect apparatus and a network management apparatus, which are provided by the present invention.

As an example, the following description explaining the embodiments of the present invention takes a case in which an optical cross connect apparatus handles a terminal such as a router carrying communications by using a WAN PHY signal or a 10G POS signal. However, the scope of the present invention is not limited to such a terminal and such signals. The present invention can be applied to all signals that can be processed by the optical cross connect apparatus.

A person in charge of system maintenance may operate the network management apparatus to set transmission lines to connect a plurality of bases to each other through optical cross connect apparatus. In this case, there may be a difference in physical interface type or a difference in protocol type. The existence of such a difference causes interfaces to mismatch. Thus, if such a difference exists, it is necessary to deny a command issued by the person in charge of system maintenance as a command of setting transmission lines to connect a plurality of bases to each other. For this reason, the network management apparatus is provided with a function to detect a mismatching-interface situation and a function to cancel a line-setting process in the optical cross connect apparatus in the event of mismatching interfaces. As a result, it is possible to achieve objects of the embodiments described below to be capable of preventing terminals using different signals from being connected to each other in advance and capable of reporting incorrect line setting to the person in charge of system maintenance as a warning.

First Embodiment

Figure 1:
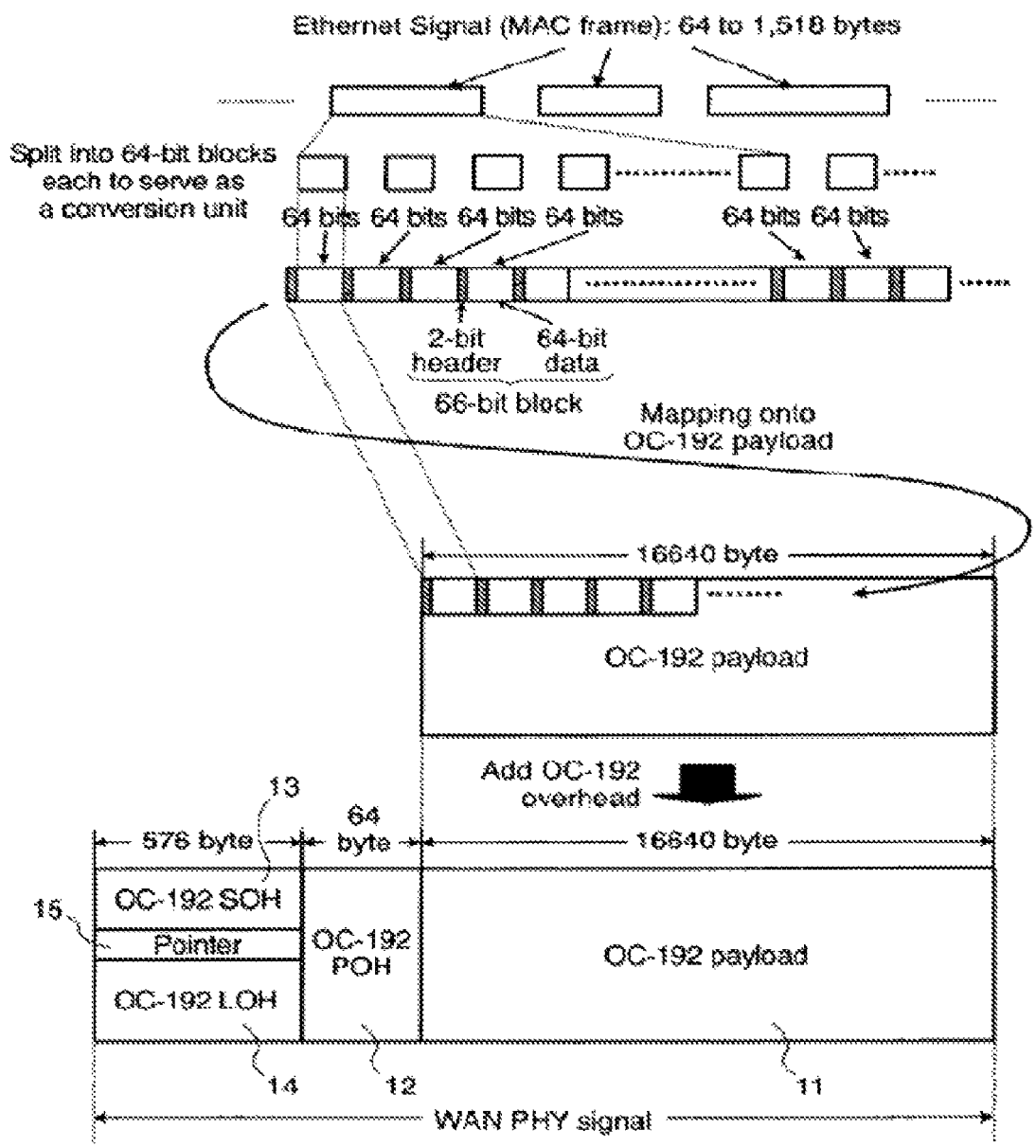
FIG. 1 is a diagram showing the frame format of a WAN PHY signal.
Figure 2:
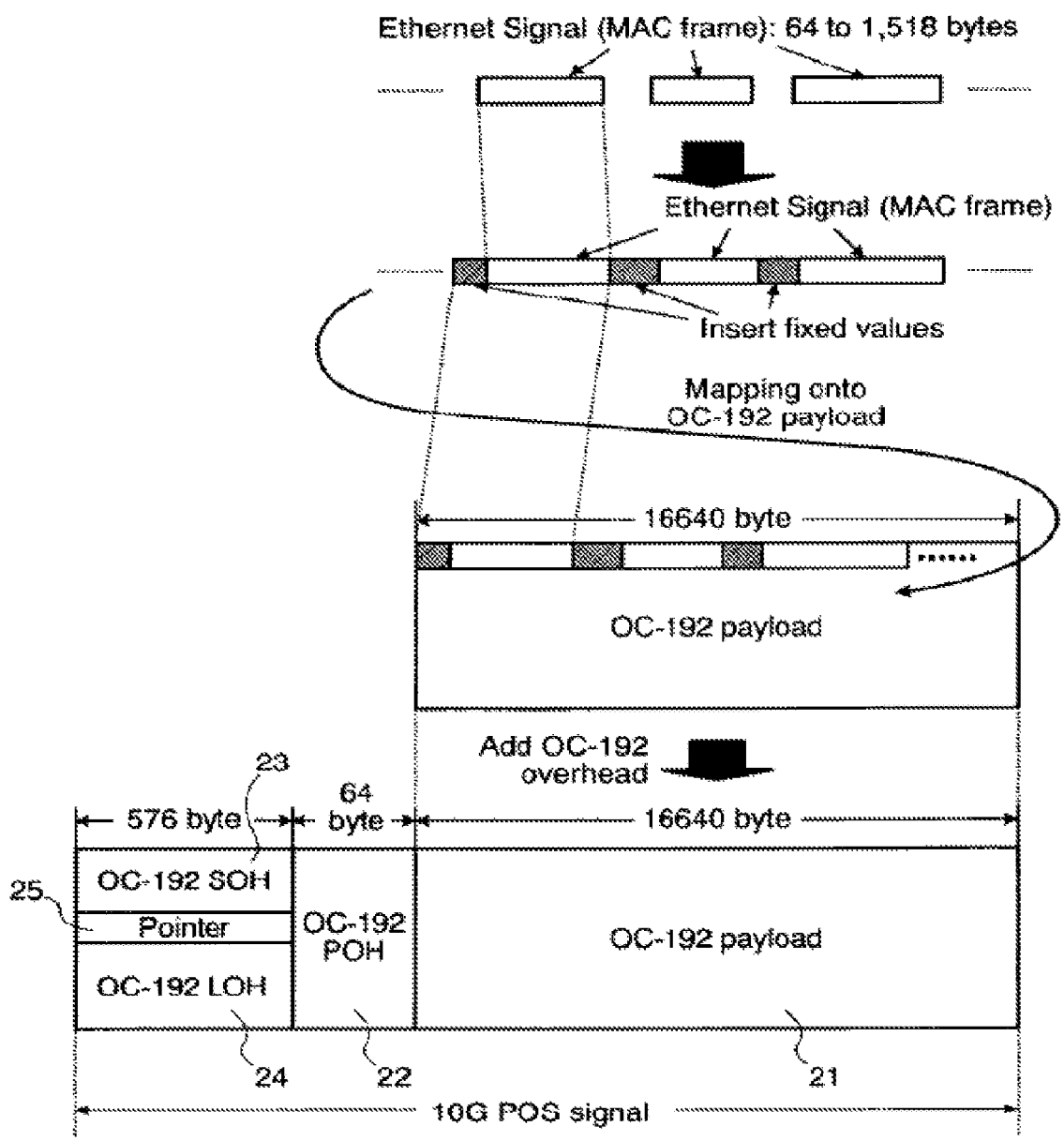
FIG. 2 is a diagram showing the frame format of a 10G POS signal.
Figure 3:
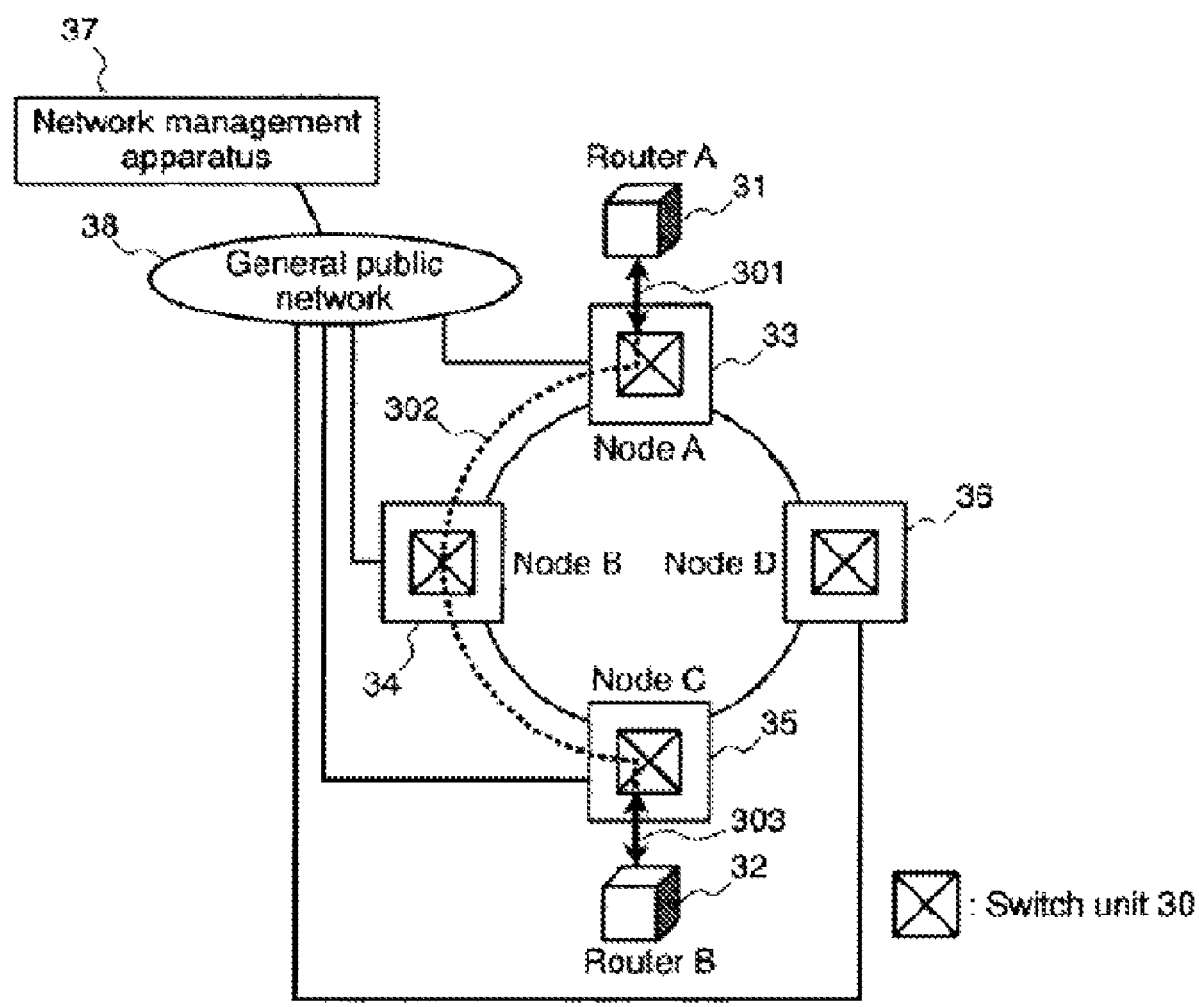
FIG. 3 is a diagram showing a system configuration of the conventional technology.
Figure 4:
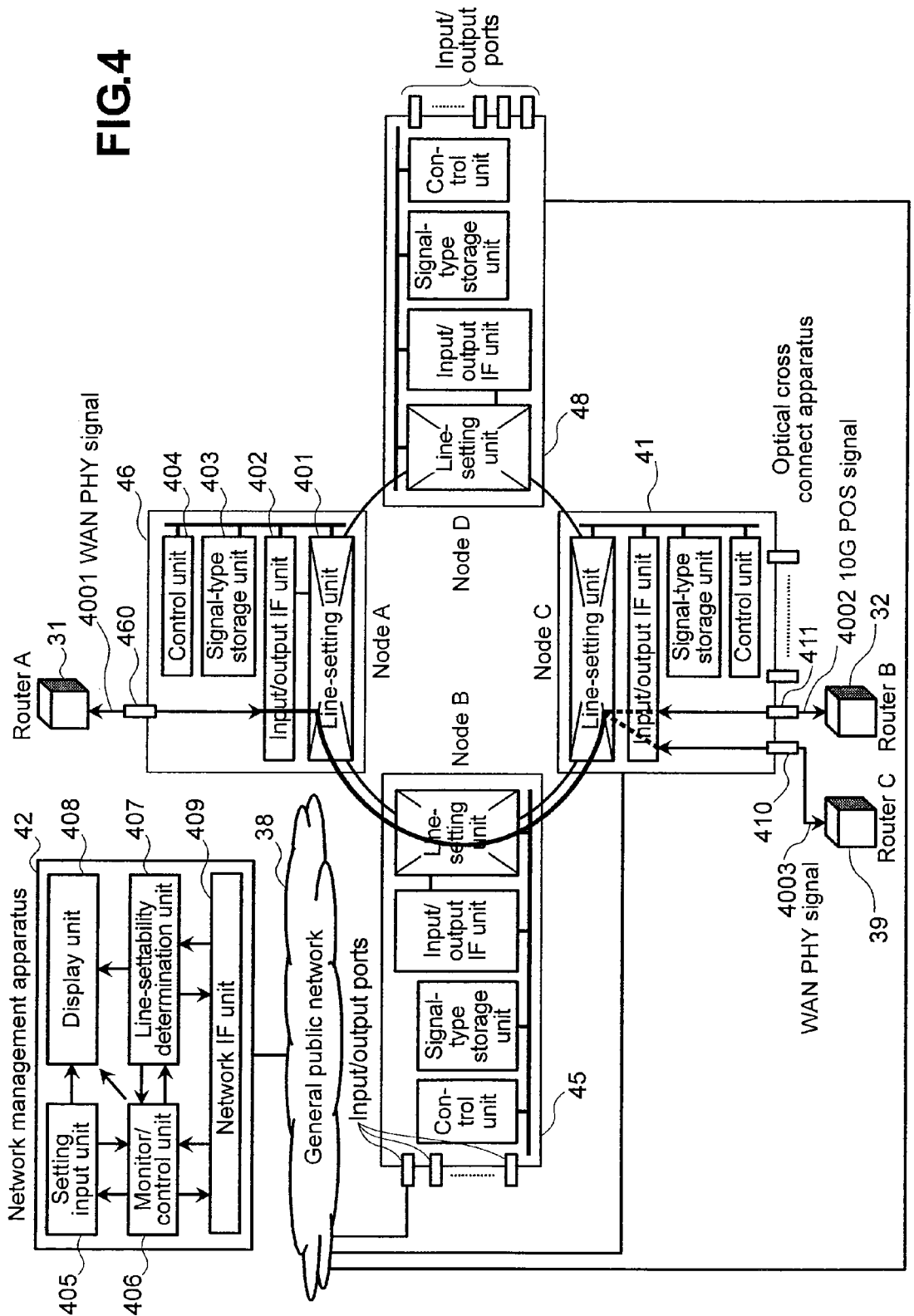
FIG. 4 is a diagram showing a system configuration of a first embodiment of the present invention.

FIG. 4 is a diagram showing a system configuration of a first embodiment implementing an optical cross connect system comprising optical cross connect apparatus and a network management apparatus, which are provided by the present invention. More specifically, the optical cross connect system is constituted of nodes A46, B45, C41 and D48, which are the optical cross connect apparatus and linked to each other to form a ring-shaped connection, and a network management apparatus 42 for monitoring and controlling the nodes. The network management apparatus 42 is connected to the nodes by a general public network 38 such as DCN (Data Communication Network) lines provided by a communication carrier company to monitor and control the nodes from a remote location. It is to be noted that the network management apparatus 42 can also be directly connected to the nodes without using the general public network 38. As another alternative, the network management apparatus 42 can also be connected to the nodes by using a network other than the general public network 38.

In this system, a physical port 460 of the node A46 is connected to a router A31, which serves as a terminal using a WAN PHY signal. On the other hand, a physical port 410 of the node C41 is connected to a router C39 serving as a terminal also using a WAN PHY signal whereas a physical port 411 of the node C41 is connected to a router B32, which serves as a terminal using a 10G POS signal.

Figure 15:
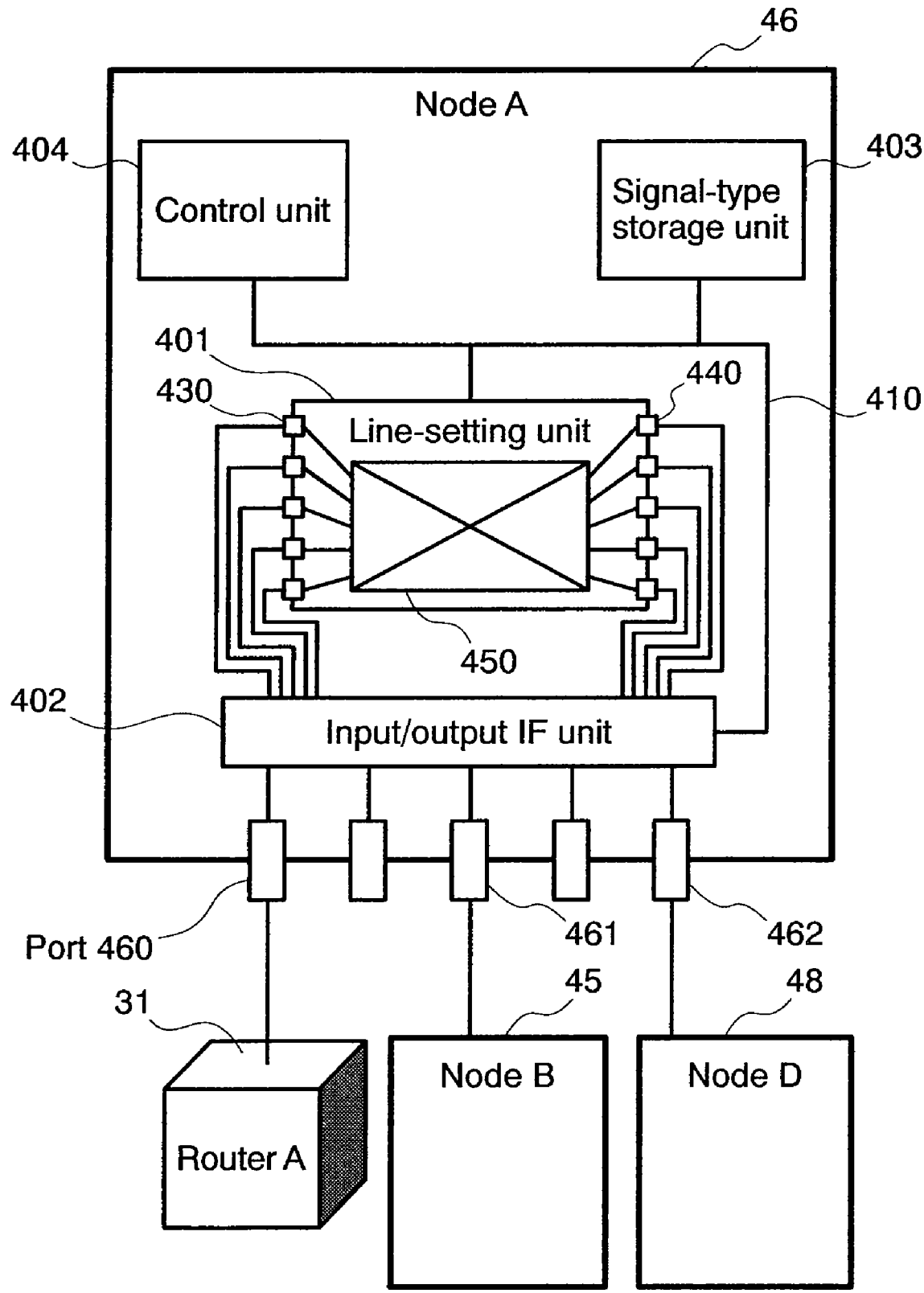
FIG. 15 is a diagram showing the configuration of each node in the first embodiment.

FIG. 15 is a diagram showing the configuration of the node A46. The nodes B45, C41 and D48 each also have the same configuration as the node A46. The node A46 comprises a line-setting unit 401, an input/output IF unit 402, a plurality of physical ports 460, a signal-type storage unit 403 and a control unit 404. The line-setting unit 401 is a component for switching and connecting optical transmission lines. The input/output IF unit 402 is a component serving as an interface between the line-setting unit 401 and terminals. The signal-type storage unit 403 is a component for storing setting data entered by a person in charge of system maintenance and the type of a signal used by a terminal connected to each of the physical ports for each input/output port. The control unit 404 is a component for issuing a command of connecting and switching optical transmission lines to the line-setting unit 401 and for controlling the entire optical cross connect apparatus. The control unit 404 is typically a CPU (Central Processing Unit). The signal-type storage unit 403 is typically a storage device such as a memory including a RAM (Random Access Memory) or a storage device such as an HDD (Hard Disk Drive).

As shown in FIG. 15, the node A46 is connected to a router A31, a node B and a node D through physical ports 460, 461 and 462 respectively. These physical ports are connected to optical input units 430 and optical output units 440 through the input/output IF unit 402. The optical input units 430 and the optical output units 440 are parts of the line-setting unit 401. It is to be noted that a port in the configuration is a physical connection opening for connecting an optical transmission line for linking the node A46 to an external apparatus such as the router A31. In this case, a port is connected to an optical transmission line on a one-to-one basis. Thus, if a port is identified, the optical transmission line connected to the port is identified as well. For this reason, in this embodiment, an optical transmission line and the contents of an optical signal transmitted through the line are recognized by identifying a port to which the line is connected. However, the port is by no means limited to such a physical connection opening for connecting the node A46 to a network as is the case with this embodiment. Instead, the port can be any means as long as the means can be used for identifying an optical transmission line connected to the means.

The line-setting unit 401 comprises an optical switch circuit 450, the aforementioned optical input units 430 and the optical output units 440 also cited above. The optical input units 430 are connected to the optical output units 440 through the optical switch circuit 450. The line-setting unit 401 switches a connection inside the optical switch circuit 450 to change over a line connecting an optical input unit 430 and an optical output unit 440. Thus, the line-setting unit 401 is capable of outputting an input received from any of the aforementioned optical input units 430 to any of the optical output units 440 cited above. The control unit 404 properly controls the operations to switch connections inside the optical switch circuit 450 to determine a route for an optical transmission line. The line-setting unit 401 can be any means as long as the means has such an optical cross connect function.

As shown in FIG. 4, on the other hand, the network management apparatus 42 comprises a setting input unit 405, a display unit 408, a monitor/control unit 406, a line-settability determination unit 407 and a network IF unit 409. The setting input unit 405 includes a mouse, a keyboard and a voice input device, which are used by the person in charge of system maintenance to enter information for executing various kinds of control on the nodes. The display unit 408 includes an LCD, LEDs and a buzzer, which are used for displaying setting input screens of the nodes and warnings. The line-settability determination unit 407 is a component for determining whether or not a connection is possible and reporting a result of determination to the monitor/control unit 406. To put it in detail, the line-settability determination unit 407 determines whether or not a connection between input/output ports of nodes is possible by collecting types of signals input and output by the input/output ports of the nodes from the signal-type storage unit 403 of each of the nodes and comparing the types of the signals with each other. If information on the input port does not match information on the output port to be connected to the input port, the line-settability determination unit 407 determines that the connection is impossible. The monitor/control unit 406 is a component for collecting determination results output by the line-settability determination unit 407, gathering operating conditions of the nodes and warnings from the nodes and controlling connections between some of the nodes in accordance with a command received from the person in charge of system maintenance. The network IF unit 409 is a component for transmitting and receiving information to and from communication lines connected to the nodes.

The monitor/control unit 406 and the line-settability determination unit 407 can each conceivably be implemented by using a CPU. The setting input unit 405 and the display unit 408 can each be physically attached to the network management apparatus 42 or provided at a location separated away from the network management apparatus 42. In the later case, the setting input unit 405 and the display unit 408 each need a function to communicate with the network management apparatus 42 if necessary. That is to say, the setting input unit 405 and the display unit 408 can be integrated into a single unit that can be carried by the person in charge of system maintenance as means for communicating with the network management apparatus 42 through radio communication. As another alternative, the setting input unit 405 and the display unit 408 are integrated into a single unit resembling a touch-panel screen.

FIG. 5 is a diagram showing signal-type tables each stored in the signal-type storage unit 403 employed in the nodes. The signal-type tables are a signal-type table 510 for the node A46, a signal-type table 520 for the node B45, a signal-type table 530 for the node C41 and a signal-type table 540 for the node D48. As shown in the figure, the entry of a signal-type table is created for a physical port of a node for which the table is created. In the figure, a physical port is denoted by a symbol such as 'a' or 'b', which is the identification of the port. Any other symbol such as a number can be used for denoting a physical port as long as the other symbol can be used as an identification for the port. An entry created for a physical port in the signal-type table provided by the embodiment describes the type of a signal input and output through the port. The type of such a signal is described in terms of a frame configuration, mapping method and L2 protocol type of the signal.

Assume for example that ports a, b and d of the node A46 are each connected to a terminal such as a router. In this case, the following information is cataloged in the signal-type table of the node A46. Let each of ports a and b of the node A46 be connected to a terminal using a WAN PHY signal. In this case, since the signals used by the ports are each a WAN PHY signal, the description of the signal type includes OC-192 as the frame configuration, 64B/66B encoding as the mapping method and Ethernet as the L2 protocol, which are cataloged in two entries 501 created in the signal-type table 510 for ports a and b respectively. Assume that port d of the node A46 is connected to a terminal using a 10G POS signal. In this case, since the signal used by the port is a 10G POS signal, the description of the signal type includes OC-192 as the frame configuration, PPP over SONET/SDH as the mapping method and Ethernet as the L2 protocol, which are cataloged in an entry 502 created in the signal-type table 510 for port d.

By the same token, the control unit 404 of each node catalogs types of signals, which are used by terminals connected to physical ports of the node, in advance in the signal-type storage unit 403. It is to be noted that, as a method of cataloging types of signals, which are used by terminals connected to physical ports of a node, in the signal-type storage unit 403 of the node, there is conceivably a technique whereby the person in charge of system maintenance enters the types of signals to the network management apparatus 42 via the setting input unit 405 of the network management apparatus 42 and then the network management apparatus 42 transmits the signal types to the control unit 404 of each of the nodes. As an alternative method, each of the nodes is provided with an input/output unit having similar functions to those of the setting input unit 405 and the display unit 408 and the person in charge of system maintenance enters types of signals directly to each of the nodes by operating the input/output unit. With the alternative method, since a person connecting each physical port of a node to a terminal such as a router can directly enter the type of a signal used by the terminal to the node, the person runs a smaller risk of setting an incorrect relation between the port and the type of the signal propagating through the port.

Figure 6:
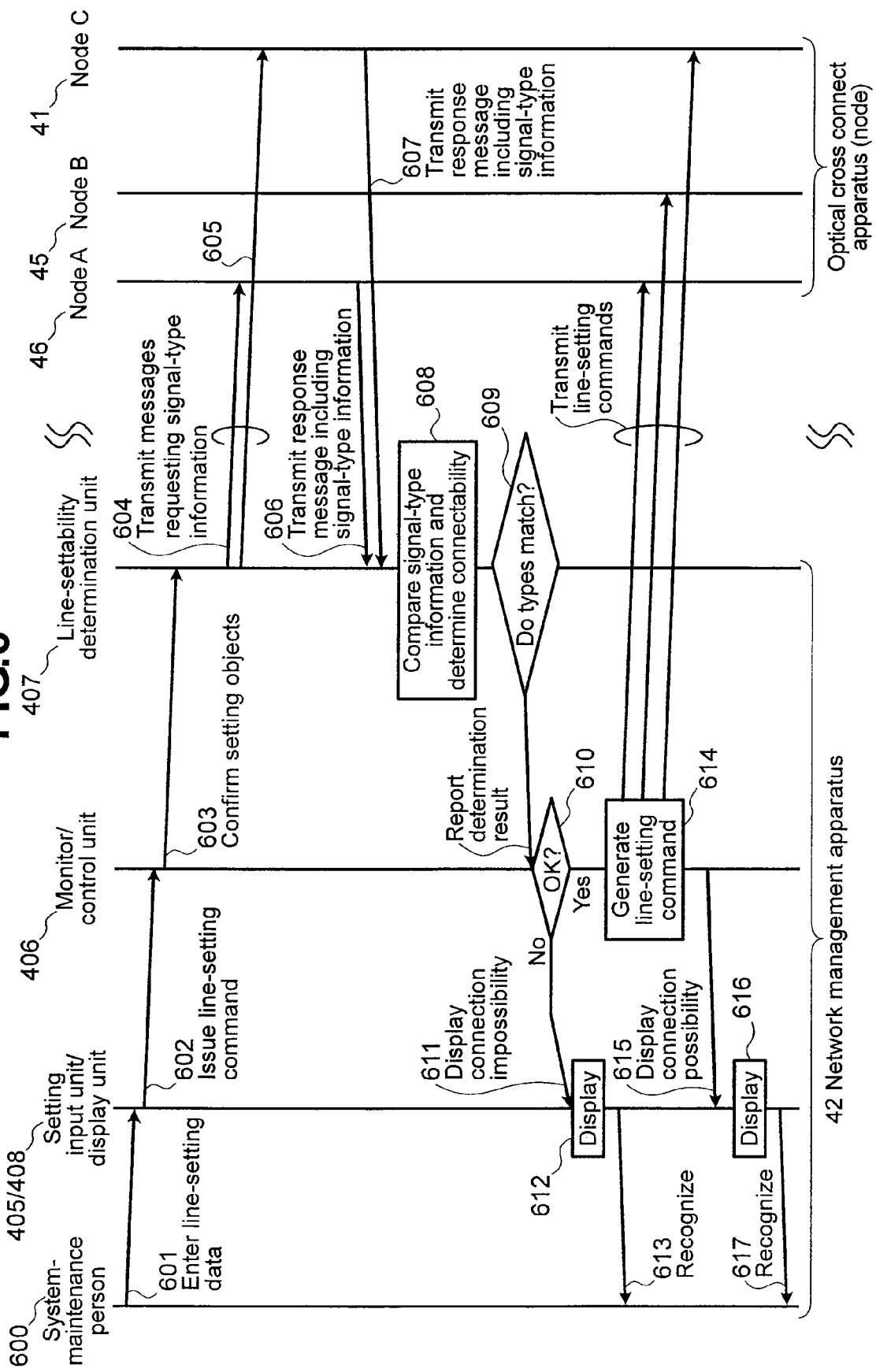
FIG. 6 shows a sequence of operations carried out by the first embodiment of the present invention.

Next, operations to set transmission lines are explained by referring to FIGS. 5 and 6. First of all, an operation 601 shown in FIG. 6 is carried out to set transmission lines between a physical port a460 of the node A46 and a physical port c410 of the node C41 as shown in FIG. 4. In this case, the person 600 in charge of system maintenance enters a line-setting command to the network management apparatus 42 via the setting input unit 405. In the operation to enter the line-setting command, the display unit 408 displays a screen like one shown in FIG. 12. The screen includes an overall network configuration diagram 1201, an already-set-path list 1202, a path-start table 1203, a relay-node table 1204, a path-end table 1205, a path-name input entry 1206 and a path-setting button 1207. The already-set-path list 1202 is a list of already set paths. The path-start table 1203 is a table of nodes and ports. A node and a port can be selected from the path-start table 1203 as the start point of a path being set. The relay-node table 1204 is also a table of nodes and ports. A node can be selected from the relay-node table 1204 as a relay node between the node serving as the start point of the path being set and a node serving as the end point of the same path. The path-end table 1205 is also a table of nodes and ports. A node and a port can be selected from the path-end table 1205 as the end point of the path being set.

Then, in an operation 602, the system-maintenance person 600 enters the name of the path being set to the screen, selects a node and port to serve as the start point of the path, selects a node to serve as a relay node, selects a node and port to serve as the end point of the path and presses the path-setting button 1207 to supply a line-setting command to the monitor/control unit 406. In addition, it is also possible to provide a screen configuration, which excludes the relay-node table 1204 from the screen so as to disallow the system-maintenance person 600 to select a relay node. In this case, the system-maintenance person 600 can select only a node and a port to serve as the start point of the path and select a node and a port to serve as the end point of the path.

If the system-maintenance person 600 does not select a relay node, the setting input unit 405 outputs only a node and port to serve as the start point of the path as well as a node and port to serve as the end point of the path to the monitor/control unit 406. The monitor/control unit 406 determines a relay node and an optimum route passing through the relay node from a plurality of paths that can connect the node and port selected by the system-maintenance person 600 to serve as the start point of the path to the node and port selected by the system-maintenance person 600 to serve as the end point of the path. A relay node can be determined as follows. In the case of nodes linked to each other to form a ring-like connection as shown in FIG. 4, the ports and the nodes, which have been selected as ports and nodes to serve as the start and end points of a path being set, and a relay node between the selected nodes are selected as objects of the line-setting command. In the case of nodes linked to each other to form a mesh-like connection, on the other hand, a relay node is selected so that a path passing through the relay node to connect the start node to the end node is shortest. As an alternative, any one of different techniques can be adopted as a technique suitable for the operating configuration of the network in selecting a relay node on a path being set.

Then, in an operation 603, the monitor/control unit 406 confirms setting objects such as start, relay and end nodes required by a line-setting unit 401 in switching transmission lines, supplying the setting objects to the line-settability determination unit 407.

Subsequently, in an operation 604, receiving the setting objects, the line-settability determination unit 407 outputs a message requesting the type of a signal to each of the nodes included in the setting objects. Information on the type of a signal includes the frame configuration, velocity, mapping method and protocol type of the signal. The protocol type is the type of a protocol on layer 2 in an OSI reference model. In addition, the information on the type of a signal includes information on an optical signal as information required to match corresponding information on another optical signal in a process to exchange data by using the optical signals.

In this embodiment, the line-settability determination unit 407 outputs a message requesting the type of a signal to each of the nodes included in the setting objects as described above. However, the monitor/control unit 406 may also directly transmit such a message without using the line-settability determination unit 407 to each of the nodes.

Receiving the message requesting the type of a signal from the network management apparatus 42, a node searches its signal-type table shown in FIG. 5 for information on the type of a signal flowing through a physical port specified in the message requesting the type of the signal and transmits a response including the information on the type of the signal to the network management apparatus 42. In the case of a response 606 related to the physical port a460 of the node A46, the information on the type of the signal includes OC-192 as the frame configuration, 64B/66B encoding as the mapping method and Ethernet as the L2 protocol. This signal-type information 501 is included in a signal-type response message transmitted from the node A46 to the network management apparatus 42. In the case of a response 607 related to the physical port c410 of the node C41, on the other hand, the information on the type of the signal includes OC-192 as the frame configuration, 64B/66B encoding as the mapping method and Ethernet as the L2 protocol. This signal-type information 503 is included in a signal-type response message transmitted from the node C41 to the network management apparatus 42.

Receiving the signal-type response messages 606 and 607, the network management apparatus 42 drives the line-settability determination unit 407 to carry out a signal-type comparison/determination process 608. In this signal-type comparison/determination process 608, the frame configuration, mapping method and L2 protocol type of an optical signal flowing through the physical port a460 employed in the node A46 serving as the start point of a path being set are compared with those of the physical port c410 of the node C41 serving as the end point of the path. The line-settability determination unit 407 then reports a result of the comparison to the monitor/control unit 406 in an operation 609.

Receiving the result of the comparison, the monitor/control unit 406 determines a next process in an operation 610 in accordance with whether or not the type of a signal flowing through the physical port a460 of the node A46 matches the type of a signal flowing through the physical port c410 of the node C41. If the signal types match each other, the monitor/control unit 406 confirms line setting including how the line-setting unit 401 employed in each of the nodes should perform switching and issues line-setting commands in an operation 614 to the involved nodes. The involved nodes can be the start, relay and end nodes specified by the system-maintenance person 600 via the setting input unit 405. As an alternative, the involved nodes are the start and end nodes as well as a relay node determined by the monitor/control unit 406 as a node for implementing an optimum route. In either case, since the signal types of the port a460 of the node A46 and the port c410 of the node C41 match each other in this embodiment, the monitor/control unit 406 issues a line-setting command to the nodes A46 and C41 as well as the node B45 existing between the nodes A46 and C41. As described above, the monitor/control unit 406 issues the line-setting command to the node B because the system-maintenance person 600 has explicitly selected the node B in FIG. 12 or because the monitor/control unit 406 has automatically determined the node B to be a relay node for implementing the optimum route. The line-setting unit 401 of each of the involved nodes then connects ports in the node in accordance with the line-setting command. As a result, the physical port a460 of the node A46 is connected to the physical port c410 of the node C41 through the node B.

Then, in an operation 615, in addition to the line-setting commands, the monitor/control unit 406 issues a display command to the display unit 408 as a command requesting the display unit 408 to display a message indicating that the specified nodes can be connected to each other. In accordance with the display command, the display unit 408 displays the message indicating that the specified nodes can be connected to each other in an operation 616. Thus, in an operation 617, the system-maintenance person 600 can recognize the line connection status from the message. FIG. 13 is a diagram showing a typical display screen for a case in which a connection is possible. In this typical display screen, the display unit 408 displays a message 1301 indicating that the specified nodes can be connected to each other, information 1302 on the type of a signal flowing through the physical port a460 of the node A46 and information 1303 on the type of a signal flowing through the physical port c410 of the node C41. From the displayed screen, the system-maintenance person 600 can again confirm the information on the types of signals flowing through the ports each serving as an object of line setting and confirm that the signal types match each other.

Next, the operation 601 is carried out to set transmission lines between the physical port a460 of the node A46 and a physical port e411 of the node C41. In this case, the system-maintenance person 600 enters a line-setting command to the network management apparatus 42 via the setting input unit 405 as a command to set transmission lines between the physical port a460 of the node A46 and the physical port e411 of the node C41. In the operation to enter the line-setting command, the system-maintenance person 600 can refer to the screen shown in FIG. 12 as described before. Then, in the operation 603, the monitor/control unit 406 employed in the network management apparatus 42 issues a command to the line-settability determination unit 407 to transmit a message to each of nodes specified by the system-maintenance person 600 in the line-setting command as a message requesting each of the nodes to transmit information on the type of its signal to the network management apparatus 42 as described earlier. Then, in the operations 604 and 605, in accordance with the command received from the monitor/control unit 406, the line-settability determination unit 407 transmits the message requesting information on the type of a signal handled by each of the nodes to each of the nodes. As described earlier, the monitor/control unit 406 can also directly transmit the message requesting information on the type of a signal to each of the nodes.

Receiving the message requesting the type of a signal from the network management apparatus 42, a node searches its signal-type table shown in FIG. 5 for information on the type of a signal flowing through a physical port specified in the message requesting the type of the signal and transmits a response including the information on the type of the signal to the network management apparatus 42. In the case of a response 606 related to the physical port a460 of the node A46, the information on the type of the signal includes OC-192 as the frame configuration, 64B/66B encoding as the mapping method and Ethernet as the L2 protocol. This signal-type information 501 is included in a signal-type response message transmitted from the node A46 to the network management apparatus 42. In the case of a response 607 related to the physical port e411 of the node C41, on the other hand, the information on the type of the signal includes OC-192 as the frame configuration, PPP-over-SONET/SDH encoding as the mapping method and Ethernet as the L2 protocol. This signal-type information 504 is included in a signal-type response message transmitted from the node C41 to the network management apparatus 42.

Receiving the signal-type response messages 606 and 607, the network management apparatus 42 drives the line-settability determination unit 407 to carry out the signal-type comparison/determination process 608. In this signal-type comparison/determination process 608, the frame configuration, mapping method and L2 protocol type of an optical signal flowing through the physical port a460 employed in the node A46 serving as the start point of a path being set are compared respectively with those of the physical port e411 of the node C41 serving as the end point of the path. The line-settability determination unit 407 then reports a result of the comparison to the monitor/control unit 406 in the operation 609.

Receiving the result of the comparison, in the operation 610, the monitor/control unit 406 detects the fact that the signal types for the ports do not match each other. In this case, a line-setting command is not issued to the nodes.

To be more specific, in this embodiment, the mapping method included in the information on the type of the WAN PHY signal 4001 flowing through the physical port a460 employed in the node A46 does not match the mapping method included in the information on the type of the 10G POS signal 4002 flowing through the physical port e411 employed in the node C41. Thus, the line-setting command entered by the system-maintenance person 600 is rejected and no line-setting command is issued to the nodes A46, B45 and C41. In addition, in an operation 612, the monitor/control unit 406 issues a command 611 to display a message indicating an impossible connection to the display unit 408 and, in an operation 613, the system-maintenance person 600 makes itself aware of the fact that the system-maintenance person 600 has made an attempt to set an incorrect connection.

FIG. 14 is a diagram showing a typical screen displaying an impossible connection. The screen includes a reason 1401 why the requested connection is impossible, pre-cataloged information 1402 on the type of a signal flowing through physical port 1 of the node A46 and pre-cataloged information 1403 on the type of a signal flowing through physical port 5 of the node C41. In this embodiment, the requested connection cannot be implemented because, even though the signals have the same frame configuration of OC-192, they have different mapping methods cataloged in advance in the signal-type tables. The displayed screen shows the reason why the requested connection cannot be implemented.

As described above, in the operation 616, a message is displayed on the display unit 408 to indicate transmission lines can be set normally. In the operation 612, on the other hand, the displayed message shows status indicating that a line-setting command entered by the system-maintenance person 600 is rejected and, in addition, indicating that the type of a signal handled by the terminals to be connected are different from each other as a reason why the requested line setting would result in an incorrect connection. The status can be displayed by using LEDs or displayed on an LCD. As an alternative, a buzzer or the like can be used to report the status to the system-maintenance person 600 as an audible warning. Anyway, the status can be reported to the user by using any method as long as the method is capable of making the system-maintenance person 600 aware of the status.

Second Embodiment

Figure 7:
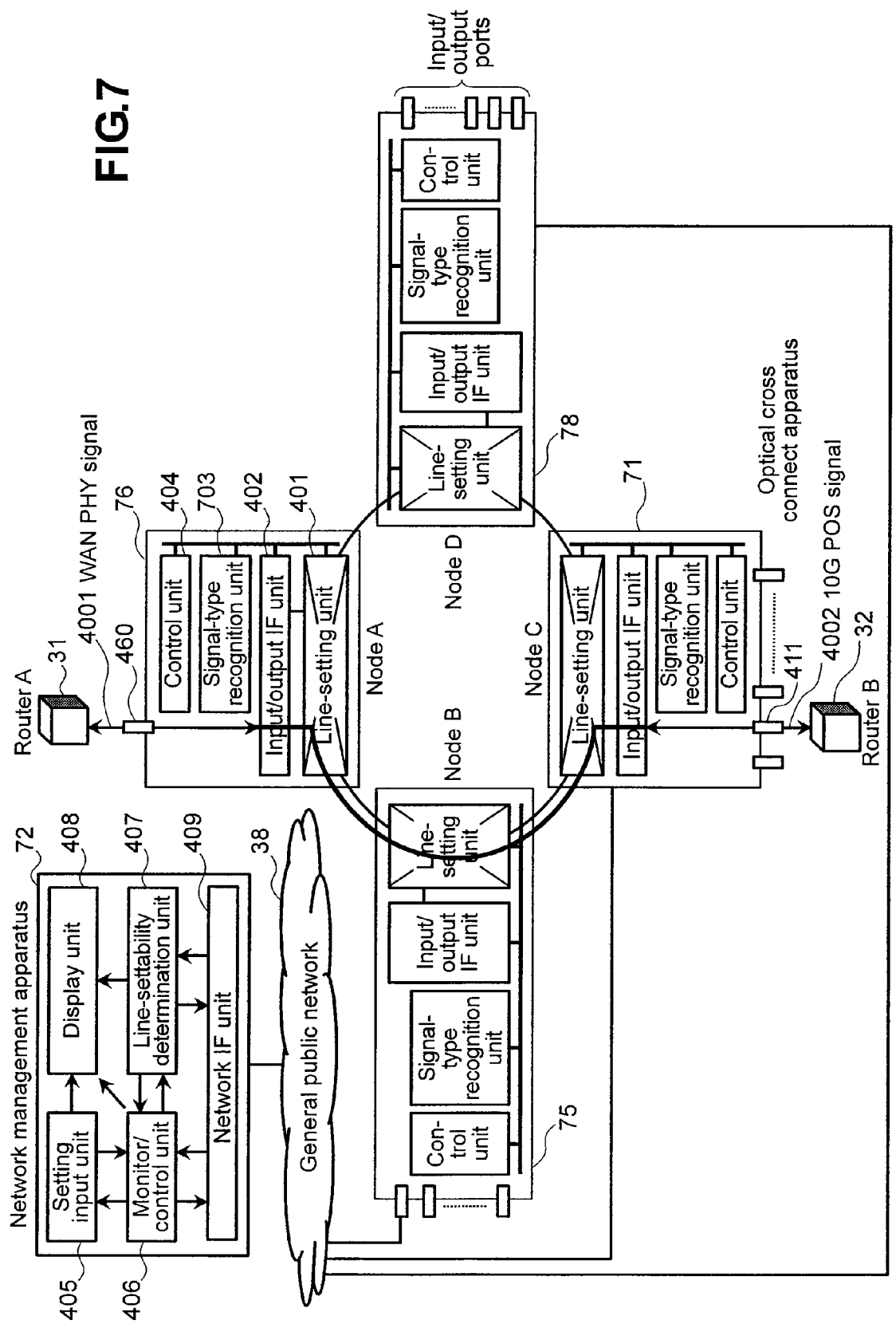
FIG. 7 is a diagram showing a system configuration of a second embodiment of the present invention.

FIG. 7 is a diagram showing a system configuration of a second embodiment implementing an optical cross connect system comprising optical cross connect apparatus and a network management apparatus, which are provided by the present invention, in the same configuration as the first embodiment. More specifically, the optical cross connect apparatus of the optical cross connect system implemented by the embodiment are nodes A76, B75, C71 and D78 linked to each other to form a ring-shaped connection, and the network management apparatus 72 is used for monitoring and controlling the nodes. The network management apparatus 72 is connected to the nodes A76, B75, C71 and D78 by a general public network 38 to monitor and control the nodes from a remote location. In this system, a physical port e411 of the node C71 is connected to a router B32, which serves as a terminal using a 10G POS signal. On the other hand, a physical port a460 of the node A76 is connected to a router A31 serving as a terminal using a WAN PHY signal.

Figure 16:
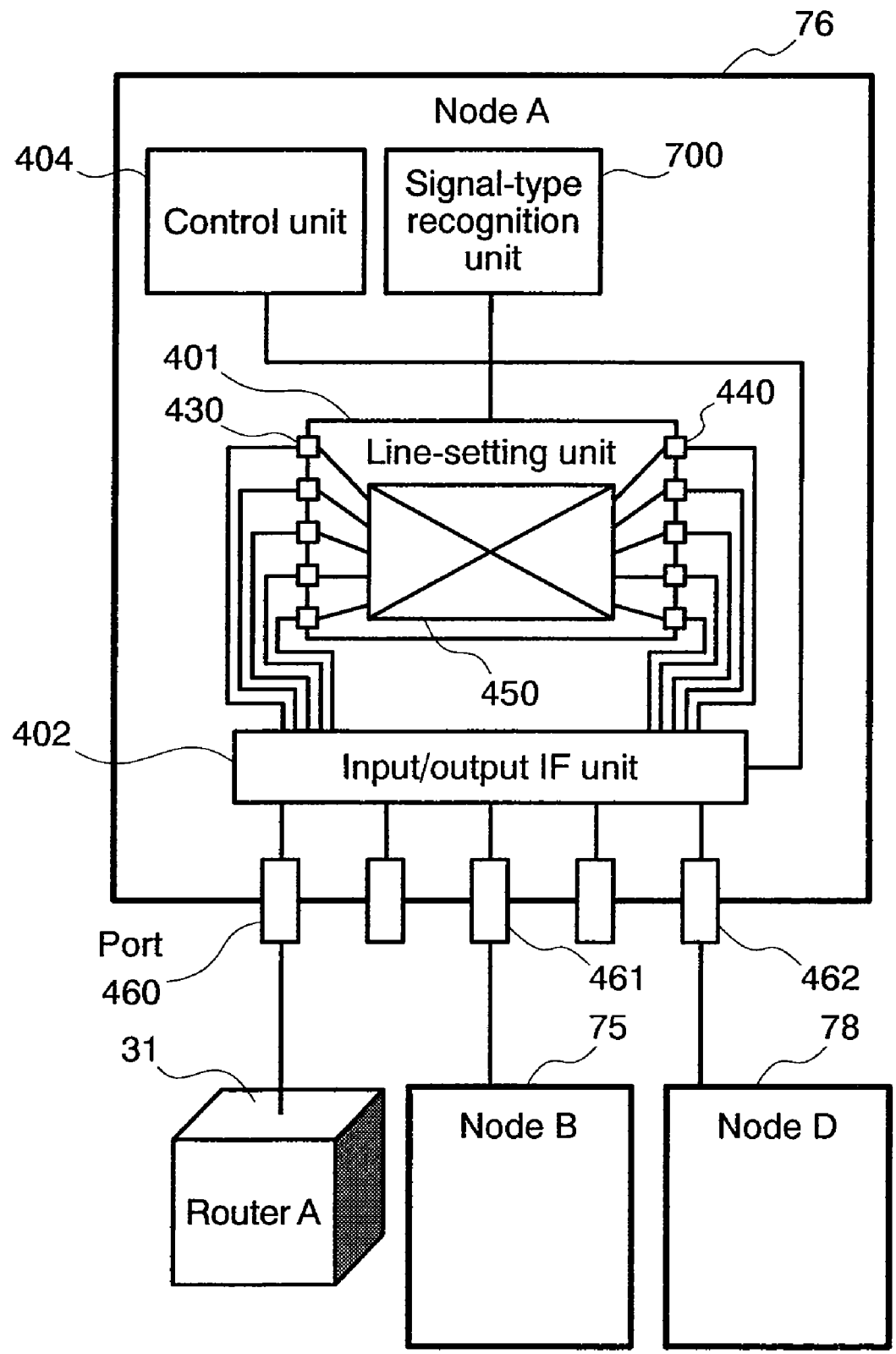
FIG. 16 is a diagram showing the configuration of each node in the second embodiment.

FIG. 16 is a diagram showing the configuration of each of the nodes employed in this embodiment. In place of the signal-type storage unit 403 employed in the first embodiment, each of the nodes included in this embodiment employs a signal-type recognition unit 700. Otherwise, this embodiment has the same configuration as the first embodiment, which is shown in FIGS. 4 and 15. In addition, the network management apparatus 72 is the same as the network management apparatus 42 shown in FIG. 4. The signal-type recognition unit 700 employed in a node has a function for identifying the type of a signal flowing through each port of the node by monitoring the signal when the signal propagates through the port. As a method of determining the type of a user signal received from a terminal, there is conceivably a technique whereby the user signal is monitored typically by once converting the signal into an electrical signal, analyzing the electrical signal, that is, extracting data from the electrical signal, and finally determining the type of the user signal on the basis of the result of the analysis.

In the system configuration shown in FIG. 7, a router A31 is connected to the port a460 of the node A76 so that the node A76 receives a WAN PHY signal from the router A31 through the port a460 and an input/output IF 402. The WAN PHY signal received by the node A76 is supplied to the signal-type recognition unit 700. The signal-type recognition unit 700 then extracts information on the type of the WAN PHY signal from the WAN PHY signal and saves the information on the type of the WAN PHY signal. The information on the type of the WAN PHY signal includes OC-192 as the frame configuration, 64B/66B encoding as the mapping method and Ethernet as the L2 protocol.

On the other hand, the port e411 of the node C71 is connected to a router B32 using the 10G POS signal so that the node C71 receives the 10G POS signal from the router B42 through the port e411 and an input/output IF 402. The 10G POS signal received by the node C71 is supplied to the signal-type recognition unit 700. The signal-type recognition unit 700 then extracts information on the type of the 10G POS signal from the 10G POS signal and saves the information on the type of the 10G POS signal. The information on the type of the 10G POS signal includes OC-192 as the frame configuration, PPP-over-SONET/SDH encoding as the mapping method and Ethernet as the L2 protocol.

Next, an operation is carried out to set transmission lines between the physical port a460 of the node A76 and a physical port e411 of the node C71. In this case, the system-maintenance person 600 enters a line-setting command to the network management apparatus 72 via the setting input unit 405 as a command to set transmission lines between the physical port a460 of the node A46 and the physical port e411 of the node C41. In the operation to enter the line-setting command, the system-maintenance person 600 can refer to the screen shown in FIG. 12 in the same way as the first embodiment. Receiving the line-setting command entered via the setting input unit 405, the monitor/control unit 406 finds an optimum route for the transmission lines being set and determines which nodes are to receive a line-setting command in order to realize the optimum route. The monitor/control unit 406 then gives a command to the line-settability determination unit 407 to transmit a message to each of the nodes as a message requesting each of the nodes to transmit information on the type of its signal to the network management apparatus 72. In accordance with the command, the line-settability determination unit 407 transmits the message to the nodes A76 and C71 as a message requesting each of the nodes to transmit information on the type of its signal the network management apparatus 72.

It is to be noted that, much like the first embodiment, the system-maintenance person 600 may also explicitly set a path connecting the node A serving as a start point to the node C serving as an end point through a relay node and, in addition, the, the monitor/control unit 406 may also directly transmit a message requesting each of the nodes to output information on the type of its signal without using the line-settability determination unit 407.

In response to the message making a request for information on the type of a signal, the nodes A76 and C71 each transmit a signal-type response message to the network management apparatus 72. The signal-type response message includes the requested signal-type information acquired by and saved in the signal-type recognition unit 700. To put it in detail, the signal-type response message for the port a460 of the node A76 is signal-type information including OC-192 as the frame configuration, 64B/66B encoding as the mapping method and Ethernet as the L2 protocol. The signal-type information has been acquired by the signal-type recognition unit 700 employed in the node A76 from a signal received by the port a460. On the other hand, the signal-type response message for the port e411 of the node C71 is signal-type information including OC-192 as the frame configuration, PPP-over-SONET/SDH encoding as the mapping method and Ethernet as the L2 protocol. This signal-type information has been acquired by the signal-type recognition unit 700 employed in the node C71 from a signal received by the port e411.

Receiving the signal-type response messages from the nodes A76 and C71, the network management apparatus 72 drives the line-settability determination unit 407 to carry out a signal-type comparison/determination process. In this signal-type comparison/determination process, the frame configuration, mapping method and L2 protocol type of an optical signal flowing through the physical port a460 employed in the node A76 serving as the start point of a path being set are compared respectively with those of the physical port e411 of the node C71 serving as the end point of the path. The line-settability determination unit 407 then reports a result of the comparison to the monitor/control unit 406. The subsequent processing is the same sequence as the first embodiment, that is, the sequence of the operation 609 shown in FIG. 6 and the operations following the operation 609. In this subsequent processing, the status of the line setting and a cause of a connection failure, if any, are reported to the person in charge of system maintenance.

As described above, in this embodiment, instead of using signal-type information entered by the system-maintenance person 600 and cataloged in the signal-type storage unit 403 as is the case with the first embodiment, signal-type information identified by the signal-type recognition unit 700 from a signal received by a node employing the signal-type recognition unit 700 is used to detect an incorrect connection. This technique is particularly effective for switching connections between ports if the types of optical signals passing through the ports do not change. Also in the case of this embodiment, the person in charge of system maintenance can recognize the status of line setting in the same way as the first embodiment. In addition, if the line setting would result in an incorrect connection, the line setting is canceled to avoid the incorrect connection and the status of the line setting as well as a cause of a connection failure can be reported to the person in charge of system maintenance.

Third Embodiment

Figure 8:
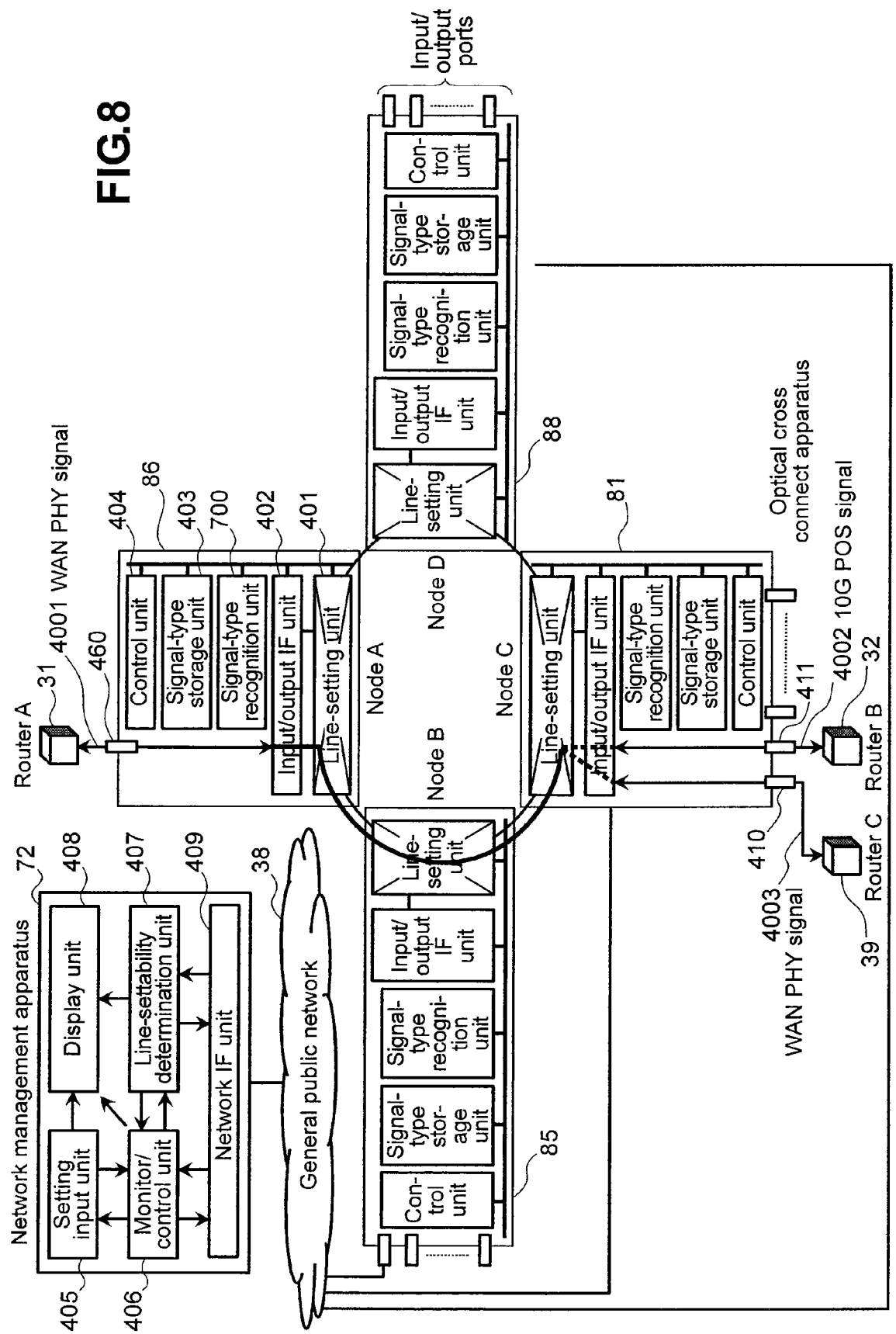
FIG. 8 is a diagram showing a system configuration of a third embodiment of the present invention.

FIG. 8 is a diagram showing a system configuration of a third embodiment implementing an optical cross connect system comprising optical cross connect apparatus and a network management apparatus, which are provided by the present invention, in the same configuration as the first and second embodiments. The optical cross connect apparatus of the optical cross connect system implemented by the embodiment are nodes A86, B85, C81 and D88 and the network management apparatus 72 is used for monitoring and controlling the nodes.

Figure 17:
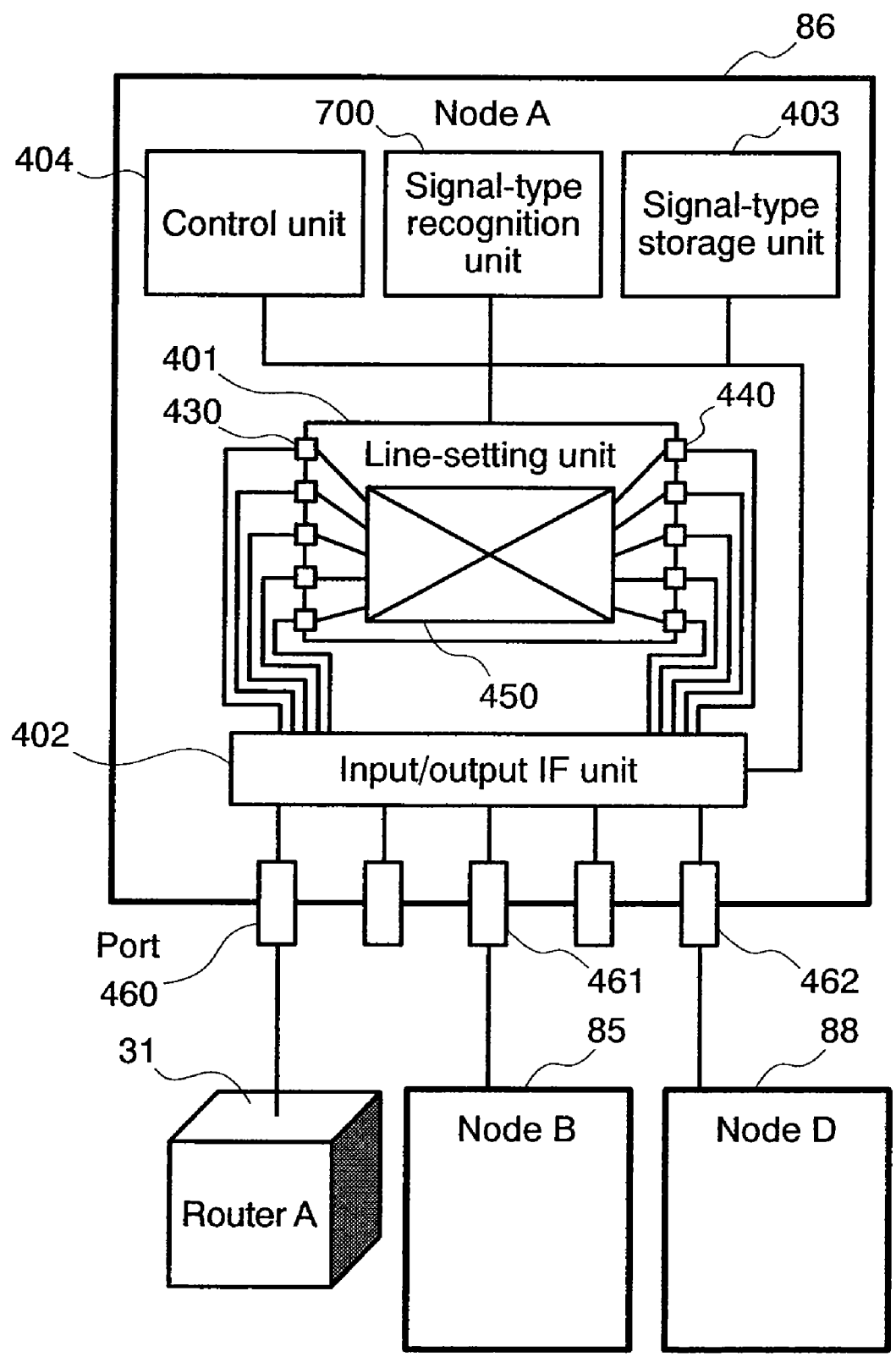
FIG. 17 is a diagram showing the configuration of each node in the third embodiment.

FIG. 17 is a diagram showing the configuration of the node A86 employed in this embodiment. The configuration of the node A includes both the signal-type storage unit 403 employed in the first embodiment and the signal-type recognition unit 700 employed in the second embodiment. The configuration of the optical cross connect system as a whole is the same as those of the first and second embodiments shown in FIGS. 4 and 7 respectively. In addition, the internal configuration of a network management apparatus 72 employed in this embodiment is the same as the network management apparatus 42 shown in FIG. 4.

If the port a460 of the node A86 is connected to a terminal such as the router A31 using a WAN PHY signal as shown in FIG. 8, for example, since the used signal is a WAN PHY signal, the system-maintenance person 600 catalogs signal-type information including OC-192 as the frame configuration, 64B/66B encoding as the mapping method and Ethernet as the L2 protocol in the signal-type table of the signal-type storage unit 403. By the same token, if the port c410 of the node C81 is connected to a terminal such as the router C39 also using a WAN PHY signal, since the used signal is a WAN PHY signal, the system-maintenance person 600 also catalogs signal-type information including OC-192 as the frame configuration, 64B/66B encoding as the mapping method and Ethernet as the L2 protocol in the signal-type table of the signal-type storage unit 403 of the node C81.

Assume a case in which the person in charge of system maintenance mistakenly connects the router B32 serving as a terminal using a 10G POS signal to port 5 of the node C81 instead of connecting the router C39 serving as a terminal using a WAN PHY signal. Even in this case, the signal-type recognition unit 700 employed in the node C81 obtains the signal-type information for a signal passing through the port c410 from the signal received from the port c410, and recognizes the signal-type information as information including OC-192 as the frame configuration, PPP-over-SONET/SDH encoding as the mapping method and Ethernet as the L2 protocol.

The control unit 404 employed in the node C81 compares the signal-type information recognized by the signal-type recognition unit 700 to be the signal-type information for the 10G POS signal passing through the port C410 with the signal-type information cataloged by the system-maintenance person 600 in the signal-type storage unit 403 for the port c411 as the signal-type information for the WAN PHY signal only to detect a mismatch between the two pieces of signal-type information. In this case, the control unit 404 employed in the node C81 informs the line-settability determination unit 407 of the network management apparatus 42 through the general public network 38 that the type of a user signal passing through the port c410 of the node C81 does not match the signal type cataloged by the system-maintenance person 600 for the port c410.

Since the type of a signal actually propagating through a transmission line connected to the port c410 of the node C81 does not match the signal type cataloged by the system-maintenance person 600 for the port c410, the line-settability determination unit 407 employed in the network management apparatus 72 determines that the line cannot be used. Then, the line-settability determination unit 407 notifies the person in charge of system maintenance through the monitor/control unit 406 and the display unit 408 that the signal type information recognized from a received user signal does not match the signal-type information cataloged in advance.

FIG. 18 is a diagram showing a typical screen displayed on the display unit 408 as a screen informing the system-maintenance person 600 that cataloged signal-type information does not match recognized signal-type information. In order to prompt the system-maintenance person 600 to pay attention to a detected mismatch between the two pieces of signal-type information, the typical screen shows a window 1801 indicating a port of a node for the detected mismatch, signal-type information 1802 stored in the signal-type storage unit 403 for the port and signal-type information 1803 recognized by the signal-type recognition unit 700 as the signal-type information of a signal actually passing through the port. It is to be noted that each node can be provided with a display means like the display unit 408 and a warning screen like the one shown in FIG. 18 can be displayed on the display means of each node.

As described above, this embodiment compares signal-type information recognized by the signal-type recognition unit 700 from a received signal with signal-type information cataloged by the person in charge of system maintenance in the signal-type storage unit 403 in advance in the same way as the first embodiment. From the result of the comparison, the line-settability determination unit 407 determines whether or not a terminal connected to the input/output IF unit 402 is an apparatus having a signal type matching a signal type deliberately cataloged by the person in charge of system maintenance and, if the terminal is not an apparatus having a signal type matching the cataloged signal type, the monitor/control unit 406 is capable of informing the person in charge of system maintenance. Thus, not only can an incorrect connection of transmission lines be avoided in advance, but the person in charge of system maintenance can also be informed of what incorrect connection would be set as well as the status and cause of the incorrect connection.

It is to be noted that such a mismatch between the two pieces of signal-type information can be detected not only by the line-settability determination unit 407 employed in the network management apparatus 72 in an operation actually carried out by the system-maintenance person 600 to connect transmission lines, but also by the control unit 404 employed in each node by autonomously comparing the signal-type information stored in the signal-type storage unit 403 with the signal-type information recognized by the signal-type recognition unit 700 and transmitting a warning message to the network management apparatus 72 to be displayed on the display unit 408 of the network management apparatus 72 in the event of a detected mismatch. By doing in this way, wrong signal-type information entered by the person in charge of system maintenance for any port can be recognized as a cause of an incorrect connection and corrected.

Fourth Embodiment

Figure 9:
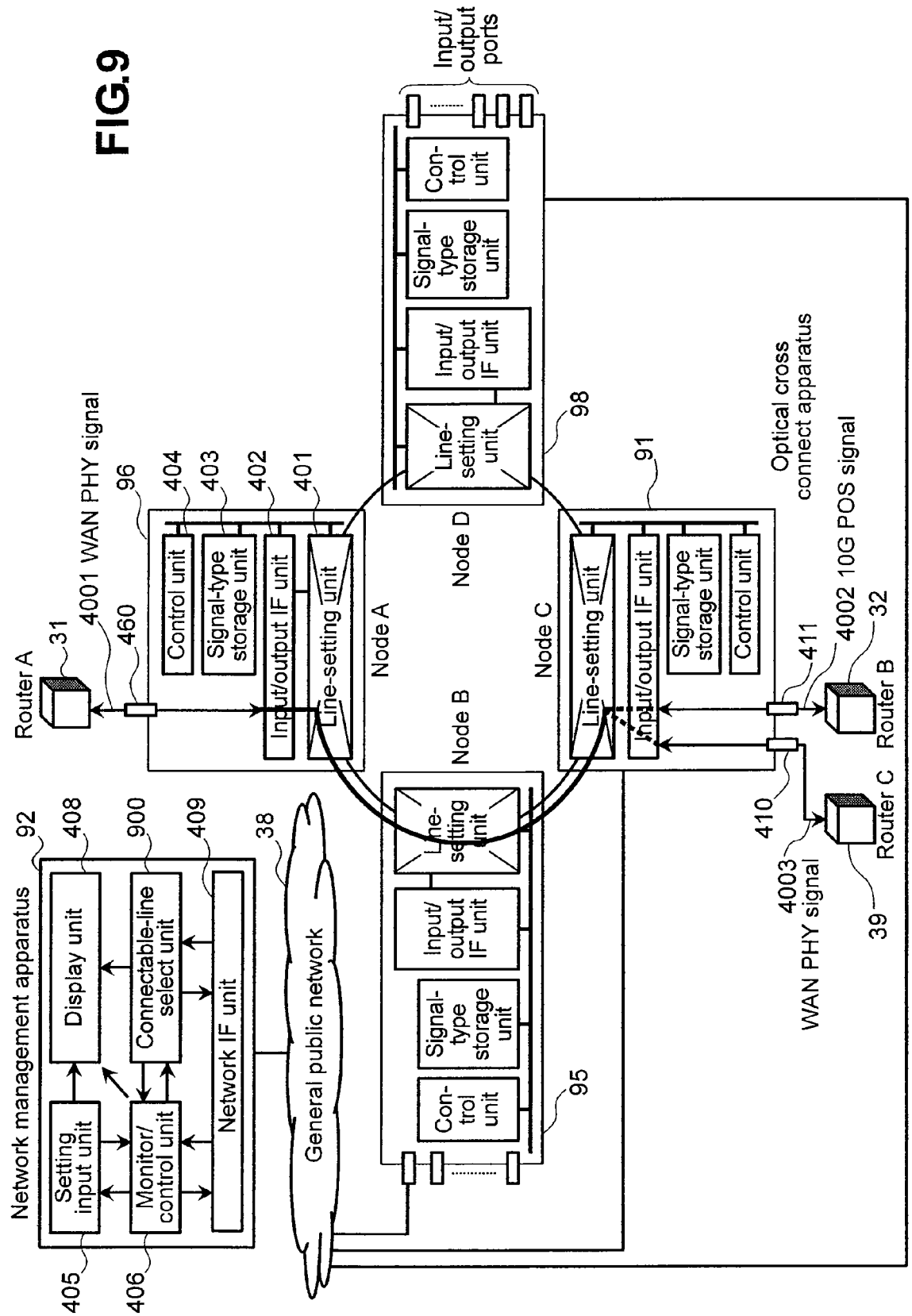
FIG. 9 is a diagram showing a system configuration of a fourth embodiment of the present invention.

FIG. 9 is a diagram showing a system configuration of a fourth embodiment implementing an optical cross connect system comprising an optical cross connect apparatus and a network management apparatus, which are provided by the present invention, in the same configuration as the first, second and third embodiments. To put it concretely, the optical cross connect apparatus employed in the optical cross connect system implemented by the embodiment are nodes A96, B95, C91 and D98 and the network management apparatus 92 is used for monitoring and controlling the nodes.

The network management apparatus 92 comprises a setting input unit 405, a display unit 408, a monitor/control unit 406 and a connectable-line select unit 900. The setting input unit 405 is a component used by the person in charge of system maintenance to enter information for executing various kinds of control on the nodes. The display unit 408 is an LCD used for displaying node-setting input screens and warnings. In addition, the display unit 408 also includes LEDs and a buzzer. The connectable-line select unit 900 is a component for reporting a pair of connectable input/output ports of nodes to the monitor/control unit 406. To put it in detail, the connectable-line select unit 900 determines whether or not a connection between input/output ports of nodes is possible by collecting types of signals input and output by the input/output ports of the nodes from the signal-type storage unit 403 of each of the nodes and comparing the types of the signals to identify input and output ports having matching signal types as connectable input/outputs ports. The monitor/control unit 406 is a component for collecting determination results output by the connectable-line select unit 900, gathering operating conditions of the nodes and warnings from the nodes and controlling connections between some of the nodes in accordance with a command received from the person in charge of system maintenance.

The network management apparatus 92 employed in this embodiment is different from the network management apparatus 42 employed in the first embodiment in that the connectable-line select unit 900 is used as a substitute for the line-settability determination unit 407 of the network management apparatus 42. Components other than the connectable-line select unit 900 are identical with their counterparts employed in the network management apparatus 42. In addition, the internal configuration of each node and the configuration of the optical cross connect system as a whole are the same as the first embodiment.

FIG. 10 is a diagram showing signal-type tables each stored in the signal-type storage unit 403 employed in every node. The signal-type tables are a signal-type table 1001 for the node A96, a signal-type table 1002 for the node B95, a signal-type table 1003 for the node C91 and a signal-type table 1004 for the node D98. It is to be noted that each of the signal-type tables is a typical table including a block enclosed by a bold line as a block showing signal-type information including a signal velocity, a frame configuration, a mapping method and an L2 (layer 2) protocol. However, the contents of the information on the signal type are by no means limited to those shown in the typical signal-type table. That is to say, other information characterizing a signal or a part of the other information can be used as information on the type of the signal. If a protocol of a level higher than the L2 protocol is used, for example, information indicating whether the used protocol is the IPv4 (the Internet Protocol version 4) or the IPv6 can be conceivably used as information on the signal type. In addition, protocol information such as the FC (Fiber Channel) used in a SAN (Storage Area Network) can also be used as information on the signal type.

When the person in charge of system maintenance enters a line-setting command to the network management apparatus 92 via the setting input unit 405 employed in the network management apparatus 92 to set a path between the port a460 of the node A96 and the port c410 of the node C91 as indicated by a bold line shown in FIG. 9, the monitor/control unit 406 receiving the entered command prompts the person in charge of system maintenance through the display unit 408 to enter a node to serve as the start point of the path being set and an input/output port of the node.

FIG. 19 is a diagram showing a typical display screen for prompting the person in charge of system maintenance to enter a node to serve as the start point of the path being set and an input/output port of the node. The system-maintenance person 600 can directly enter a node 1901 and a port 1902 by operating a keyboard of the setting input unit 405. As an alternative, the system-maintenance person 600 can select a node from a node list 1903 and a port from a port table 1904 by using typically a mouse of the setting input unit 405. In this example, the person in charge of system maintenance selects the node A46 as a node to serve as the start-point node of the path and the port a460 as an input/output port of the node A46 as the start point of the path by operating the setting input unit 405 in accordance with the displayed screen.

The information entered via the setting input unit 405 is passed on to the monitor/control unit 406 and the control unit 404. The connectable-line select unit 900 transmits a message making a request for information on the signal type to all nodes managed by the network management apparatus 92. The control unit 404 employed in each of the nodes receiving the message making a request for information on the signal type gathers pieces of information on the signal type for input/output ports of the node from a signal-type table cataloged in the signal-type storage unit 403. Then, the control unit 404 transmits a signal-type response message including the pieces of information on the signal type to the network management apparatus 92. In this embodiment, the control unit 404 employed in the node A96 transmits the signal-type information included in the signal-type table 1001 shown in FIG. 10 to the connectable-line select unit 900. By the same token, the control unit 404 employed in the node B95 transmits the signal-type information included in the signal-type table 1002 shown in FIG. 10 to the connectable-line select unit 900. In the same way, the control unit 404 employed in the node C91 transmits the signal-type information included in the signal-type table 1003 shown in FIG. 10 to the connectable-line select unit 900. Likewise, the control unit 404 employed in the node D98 transmits the signal-type information included in the signal-type table 1004 shown in FIG. 10 to the connectable-line select unit 900.

The connectable-line select unit 900 employed in the network management apparatus 92 analyzes contents of the signal-type response messages received from the nodes. On the basis of results of the analysis, the connectable-line select unit 900 selects the port b of the node B95, the port c410 of the node C91 and the port a of the node D98 as input/output ports each having signal-type information matching the port a460 of the node A96 and, hence, as input/output ports each connectable to the port a460. The connectable-line select unit 900 then reports the selected input/output ports to the monitor/control unit 406. In turn, the monitor/control unit 406 passes on the input/output ports each having signal-type information matching the port a460 to the display unit 408, requesting the display unit 408 to display them.

Requested by the monitor/control unit 406, the display unit 408 displays a screen shown in FIG. 11. By referring to a table 1103 displayed on the screen as a table of connectable input and output ports, the person in charge of system maintenance can select a node, which has signal-type information matching the port a460 included in the node A96 as a port to serve as the start point of a path being set, and an input/output port of the selected node. In the case of this embodiment, the system-maintenance person 600 verifies the displayed screen and selects the port c410 of the node C91 from a connectable-input/output-port table 1103 in specifying a line-setting command. By the way, the system-maintenance person 600 can also specify this line-setting command by operating for example the keyboard of the setting input unit 405 to directly enter the name of a node and the name of a port of the node to a node-name entry 1101 and a port-name entry 1102 respectively. As another alternative, the system-maintenance person 600 can also select a node and a port of the node to serve as an end point from the connectable-input/output-port table 1103 by using typically the mouse of the setting input unit 405 in entering a line-setting command to the network management apparatus 92. In this way, the person in charge of system maintenance can select a node and a port of the node to serve as an end point by referring to input/output ports determined by the connectable-line select unit 900 to be ports connectable to the port a460 of the node A96. Thus, it is possible to prevent a wrong port in advance from being selected as a connection target for the port a460 of the node A96.

In this embodiment, only input/output ports connectable to the port a460 of the node A96 are displayed on the display unit 408 as shown in FIG. 11. That is to say, input/output ports handing signals cataloged as signals having different types are regarded as ports not connectable to the port a460 of the node A96 and thus are not displayed on the display unit 408. An example of a signal cataloged as a signal having a different type is the 10G POS signal. Thus, it is possible to avoid in advance a situation in which the person in charge of system maintenance mistakenly selects the port e411 of the node C91 as a port to be connected to the port a460 of the node A96.

This embodiment implements a typical configuration in which a connectable input/output port is selected from signal-type information cataloged in advance in the signal-type storage unit 403 employed in each node. As an alternative, as the signal-type information required for selecting a node and a port of the node, it is also possible to use signal-type information identified by the signal-type recognition unit 700 employed in each node from received user signals as is the case with the second embodiment.

In addition, in the case of this embodiment, the network management apparatus 92 transmits a message making a request for information on types of signals to all nodes. However, the network management apparatus 92 may also manage each plurality of nodes as a group and transmit a message making a request for information on types of signals only to nodes pertaining to a specific group. Assume for example that the system-maintenance person 600 manages a plurality of nodes that can be used by a user making a request for line setting as a group. In this case, the network management apparatus 92 transmits a message making a request for information on types of signals only to nodes pertaining to this group. Thus, since the number of communications between the network management apparatus 92 and the nodes decreases, the communication bandwidth of the network can be used more effectively and the processing load borne by a node not pertaining to this group also decreases as well.

In addition, when the network management apparatus 92 transmits a message making a request for information on types of signals to nodes, signal-type information entered by the user as information on the type of a signal handled by a port is also transmitted to the nodes. The control unit 404 employed in each of the nodes may selects specific ports of the node from the signal-type storage unit 403 as ports having signal-type information matching the signal-type information received from the network management apparatus 92 and only the selected specific ports of the node and the signal-type information of the ports are then returned to the network management apparatus 92. In this way, the amount of signal-type information transmitted by way of the network can be reduced and the processing load borne by the connectable-line select unit 900 employed in the network management apparatus 92 can hence be decreased as well.

In addition, even though the first to fourth embodiments each provide a ring-shaped network as an example, these embodiments can also be implemented for networks of other shapes such as a mesh-shaped network and a star-shaped network. That is to say, the shape of the network to which the present invention is applied is by no means limited to particular ones and the same effects of the present invention can be obtained without regard to the shape of the network.

In addition, the locations for carrying out the functions of the signal-type storage unit, the line-settability determination unit and the connectable-line select unit are by no means limited to the locations according to the embodiments. That is to say, the signal-type storage unit, the line-settability determination unit and the connectable-line select unit can be incorporated in an optical cross connect apparatus or the network management apparatus to result in the same effects of the present invention.

In addition, as a method of managing the signal-type storage unit, the line-settability determination unit and a waning-reporting unit, it is possible to adopt a management method whereby information is gathered by the network management apparatus for the purposes of implementing integrated management. As an alternative, it is also possible to adopt a method whereby information on types of signals is exchanged among nodes by using means for carrying out inter-node communications for the purposes of implementing distributed management. The same effects of the present invention can be exhibited by execution of either the integrated or distributed management.

Figure 20:
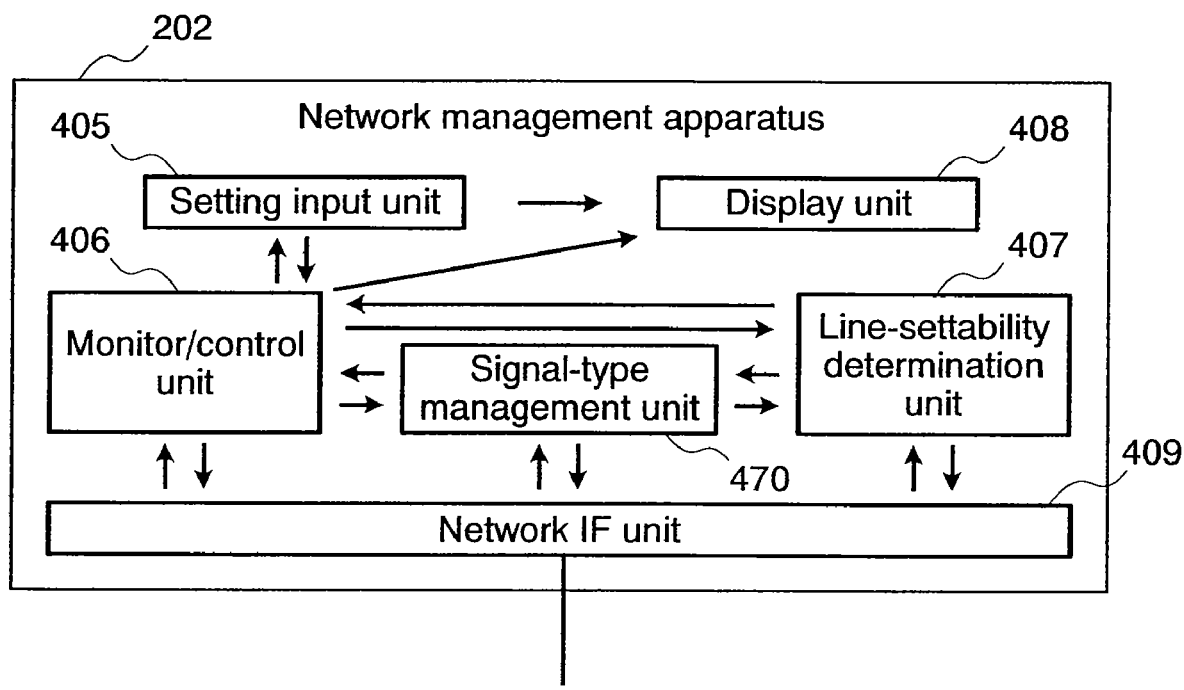
FIG. 20 is another conceivable configuration of the network management apparatus.

In addition, a signal-type management unit 470 can also be incorporated in the network management apparatus 202 as shown in FIG. 20. The signal-type management unit 470 has the same functions as the signal-type storage unit 403 provided in each node, storing information on types of signals, which are handled by ports of each node, for each node. The signal-type management unit 470 typically stores information such as the information included in the signal-type tables 1001, 1002, 1003 and 1004 shown in FIG. 10. When the person in charge of system maintenance or the like enters information on types of signals to each node, each node transmits signal-type information stored in its own signal-type storage unit 403 to the network management apparatus 202 and the network management apparatus 202 receives the information on types of signals, storing the information in the signal-type management unit 470. If the signal-type information stored in the signal-type storage unit 403 employed in a node is changed, the node transmits the changed information on types of signals to the network management apparatus 202. In this way, the consistency of the signal-type information stored in the signal-type management unit 470 employed in the network management apparatus 202 with respect to the signal-type information stored in the signal-type storage unit 403 employed in each node can be maintained. Thus, the network management apparatus 202 does not need to transmit a message making a request for information on types of signals to each node.

With this network management apparatus 202, the signal-type information stored in the signal-type management unit 470 can be used in the process carried out by the line-settability determination unit 407 to compare the type of a signal handled by a port specified as a start point with types of signals handled by ports each serving as a candidate for an end point. In addition, the line-settability determination unit 407 employed in the network management apparatus 202 can also be replaced with the connectable-line select unit 900 also incorporated in the network management apparatus 202. Also in this case, the connectable-line select unit 900 is capable of selecting a connectable input/output port on the basis of the signal-type information stored in the signal-type management unit 470 in the same way. Thus, by employing the signal-type management unit 470 in the network management apparatus 202 as described above, it is possible to eliminate the operation to be carried out by the network management apparatus 202 to transmit a message making a request for information on types of signals to each node. As a result, the processing load borne by each node can be reduced and the time it takes to carry out the processing of determining the type of a signal can also be shortened as well.

In addition, by employing the network management apparatus 202, the same effects of the present invention can be exhibited without providing the signal-type storage unit 403 in each node. In this case, signal-type information entered by the person in charge of system maintenance or the like to each node is transmitted from the node to the network management apparatus 202 and stored in the signal-type management unit 470 employed in the network management apparatus 202. In addition, in the case of the third embodiment, a signal type detected by the signal-type recognition unit 700 employed in each node is transmitted to the network management apparatus 202 along with the identification of a port handing a signal having the detected type. The line-settability determination unit 407 employed in the network management apparatus 202 then compares the signal type received from the node with the signal types already stored in the signal-type management unit 470 to identify matching or detect incorrect recognition of line setting as well as wrong setting. Results of detection of incorrect recognition of line setting as well as wrong setting are reported to the person in charge of system maintenance.

What is claimed is:

1. An optical signal transmission network management system for connecting a plurality of optical signal transmission lines to each other to set an optical signal transmission route comprising the connected optical signal transmission lines, the system comprising:

nodes, each individual one of which is placed among the optical signal transmission lines and connected to the optical signal transmission lines by ports employed in the individual node; and a management apparatus for giving a command to each individual one of the nodes to connect the optical signal transmission lines wired to the ports employed in the individual node;

wherein each individual one of the nodes includes:

a line-setting unit capable of setting a data transfer route between any two of the ports employed in the individual node;

a first control unit for giving a command to the line-setting unit to set a data transfer route between first and second ones of the ports employed in the individual node in accordance with a command received from the management apparatus; and a signal-type storage unit for storing information on an optical signal passing through each of at least some particular ones, which are selected among the ports employed in the individual node as particular ports including the first port;

wherein the management apparatus has a second control unit for transmitting a command to a specific one of the nodes as a command requesting the specific node to set an optical signal transmission route including one of the optical signal transmission lines, which is connected to the first port; and wherein the individual node retrieves information on the type of an optical signal passing through the first port from the signal-type storage unit and transmits the information to the management apparatus.

2. An optical signal transmission network management system comprising:

a plurality of nodes capable of connecting a plurality of optical signal transmission lines each wired to one of ports employed in each of the nodes by setting a data transfer route between any of the ports wired to the optical signal transmission lines; and a network management apparatus connected to the nodes by a communication network and used for issuing a command to any individual one of the nodes by way of the communication network as a command to set a data transfer route between specific ones of the ports employed in the individual node in order to establish an optical signal transmission route coupling the optical signal transmission lines wired to the specific ports, wherein the network management apparatus comprises:

a setting input unit for accepting any first one of the ports employed in any first one of the nodes and wired to any first one of the optical signal transmission lines and accepting any second one of the ports employed in any second one of the nodes and wired to any second one of the optical signal transmission lines as start and end points of the optical signal transmission route coupling the first optical signal transmission line to the second optical signal transmission line; and a first control unit for requesting the first node that first signal-type information representing properties of an optical signal propagating through the first optical signal transmission line and passing through the first port be transmitted as well as requesting the second node that second signal-type information representing properties of an optical signal propagating through the second optical signal transmission line and passing through the second port be transmitted;

the first node includes:

a signal-type storage unit for storing a relation associating the first port with the first signal-type information; and a second control unit for retrieving the first signal-type information from the signal-type storage unit and transmitting the first signal-type information to the management apparatus at a request made by the management apparatus; and the second node includes:

a signal-type storage unit for storing a relation associating the second port with the second signal-type information; and a second control unit for retrieving the second signal-type information from the signal-type storage unit and transmitting the second signal-type information to the management apparatus according to a request made by the management apparatus.

3. An optical signal transmission network management system according to claim 2, wherein the management apparatus has a line-setting determination unit for determining whether or not the first optical signal transmission line can be connected to the second optical signal transmission line by comparing the first signal-type information received from the first node with the second signal-type information received from the second node.

4. An optical signal transmission network management system according to claim 3, wherein the management apparatus has a display unit for displaying information indicating whether or not the first optical signal transmission line can be connected to the second optical signal transmission line as determined by the line-setting determination unit.

5. An optical signal transmission network management system according to claim 4, wherein the display unit also displays the first signal-type information and the second-signal type information.

* * * * *